(12) United States Patent
Karypis et al.

(10) Patent No.: US 9,678,497 B2
(45) Date of Patent: Jun. 13, 2017

(54) PARALLEL PROCESSING WITH COOPERATIVE MULTITASKING

(71) Applicant: Regents of the University of Minnesota, Minneapolis, MN (US)

(72) Inventors: George Karypis, Bloomington, MN (US); Dominique Welle LaSalle, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 498 days.

(21) Appl. No.: 14/471,707

(22) Filed: Aug. 28, 2014

(65) Prior Publication Data

US 2015/0066157 A1   Mar. 5, 2015

Related U.S. Application Data

(60) Provisional application No. 61/872,421, filed on Aug. 30, 2013.

(51) Int. Cl.
*G06F 9/46* (2006.01)
*G05B 19/042* (2006.01)
*G06F 9/48* (2006.01)

(52) U.S. Cl.
CPC ....... *G05B 19/0421* (2013.01); *G06F 9/4843* (2013.01); *G05B 2219/2231* (2013.01)

(58) Field of Classification Search
None
See application file for complete search history.

(56) References Cited

U.S. PATENT DOCUMENTS

| | | | | | |
|---|---|---|---|---|---|
| 6,466,898 | B1 * | 10/2002 | Chan | ................... | G06F 17/5022 703/14 |
| 7,058,629 | B1 * | 6/2006 | Colrain | ............... | G06F 11/0715 707/704 |
| 7,293,011 | B1 * | 11/2007 | Bedi | ................. | G06F 17/30445 |
| 7,451,255 | B2 * | 11/2008 | Gustafson | ............. | G06F 13/126 710/1 |

(Continued)

OTHER PUBLICATIONS

MacQueen et al., Some Methods for Classification and Analysis of Multivariate Observations, In Proceedings of the Fifth Berkeley Symposium on Mathematical Statistics and Probability, vol. 1, pp. 281-297, California, USA, 1967.

(Continued)

*Primary Examiner* — Adam Lee
(74) *Attorney, Agent, or Firm* — Theodore M. Magee; Westman, Champlin & Koehler, P.A.

(57) ABSTRACT

Multiple parallel slave processes and a master process are assigned to a node executing an operating system such that the operating system maintains a ready queue comprising a list of one or more processes that are ready to be executed by at least one processing core. A parallel slave process takes an action that causes the operating system to keep the parallel slave process out of the ready queue. Based on receiving an indication that the parallel slave process is to be kept out of the ready queue, the master process sets the parallel slave process to a blocking state, selects a second parallel slave process that is in a runnable state but is currently kept from being in the ready queue, and takes an action that causes the operating system to add the parallel slave process that is in the runnable state to the ready queue.

26 Claims, 13 Drawing Sheets

(56) References Cited

U.S. PATENT DOCUMENTS

| | | | | |
|---|---|---|---|---|
| 8,838,936 | B1* | 9/2014 | Salessi | G06F 12/0246 711/207 |
| 2004/0172626 | A1* | 9/2004 | Jalan | G06F 8/458 717/149 |
| 2004/0268315 | A1* | 12/2004 | Gouriou | G06F 11/362 717/129 |
| 2006/0005191 | A1* | 1/2006 | Boehm | G06F 9/52 718/100 |
| 2009/0328041 | A1* | 12/2009 | Sudzilouski | G06F 9/526 718/100 |
| 2012/0317587 | A1* | 12/2012 | Garrett | G06F 9/4881 719/314 |
| 2013/0007751 | A1* | 1/2013 | Farrell | G06F 9/545 718/102 |
| 2014/0075445 | A1* | 3/2014 | Wang | G06F 9/50 718/104 |
| 2014/0089936 | A1* | 3/2014 | Chang | G06F 9/50 718/105 |
| 2014/0181826 | A1* | 6/2014 | Wolf | G06F 9/4843 718/102 |
| 2016/0203012 | A1* | 7/2016 | Dong | G06F 9/455 718/1 |

OTHER PUBLICATIONS

Toledo, A Survey of Out-of-Core Algorithms in Numerical Linear Algebra, External Memory Algorithms and Visualization, vol. 50, pp. 161-179, 1999.
Vitter, External Memory Algorithms and Data Structures: Dealing with Massive Data, ACM Computing Surveys, vol. 33, No. 2, pp. 209-271, 2001.
Apache Mahout, http://mahout.apache.org/, 2 pages Nov. 2014.
Apache Giraph, http://giraph.apache.org, 1 page, Nov. 2014.
Apache Hadoop R, http://hadoop.apache.org, 5 pages, Nov. 2014.
Bader, D.A., et al. (Eds.), "Graph Partitioning and Graph Clustering". 10th DIMACS Implementation Challenge Workshop, Georgia Institute of Technology, Atlanta, GA, USA, Feb. 26 13-14, 2012. Proceedings, vol. 588 of Contemporary Mathematics, American Mathematical Society, 2013, 8 pages.
Bennett, J., et al., "The netflix prize", In: Proceedings of KDD cup and workshop, vol. 2007, 2007, pp. 1-4.
Berkhin, P., "A survey on pagerank computing". Internet Mathematics, vol. 2, No. 1, pp. 73-120, 2005.
Boldi, P., et al. "Layered label propagation: A multiresolution coordinate-free ordering for compressing social networks", in: Proceedings of the 20th international conference on World Wide Web, ACM Press, 2011, pp. 587-596.
Bordawekar, R., et al., "Communication strategies for out-of-core programs on distributed memory machines", in: Proceedings of the 9th international conference on Supercomputing, ACM, 1995, pp. 395-403.
Bu, Y., et al., "HaLoop: Effcient iterative data processing on large clusters", Proceedings of the VLDB Endowment, vol. 3, No. 1-2, 2010, pp. 285-296.
Dean, J., et al., "MapReduce: simplified data processing on large clusters", Communications of the ACM vol. 51, No. 1, 2008, pp. 107-113.
Dhillon, I.S., et al., "Concept decompositions for large sparse text data using clustering", Machine learning vol. 42,No. 1-2, 2001, pp. 143-175.
Fagg, G.E., et al., "FT-MPI: Fault tolerant MPI, supporting dynamic applications in a dynamic world. In Recent advances in parallel virtual machine and message passing interface", pp. 346-353, Springer, 2000.
Jin, R., et al., "Fast and exact out-of-core and Distributed k-means clustering". Knowledge and Information Systems, vol. 10, No. 1, pp. 17-40, 2006.
Kale, L., "Parallel programming with charm: An overview, Parallel Programming Laboratory", University of Illinois at Urbana-Champaign, Tech. Rep., pp. 1-19, 1993.
Kang, U. et al., "A peta-scale graph mining system implementation and observations", in: Data Mining, 2009, ICDM'09, Ninth IEEE International Conference on, IEEE, 2009, pp. 229-238.
Kumar, V., et al., "Introduction to parallel computing", vol. 110, Chapter 6, "Programming Using the Message-Passing Paradigm", Section 6.1, Benjamin/Cummings Redwood City, 1994, pp. 233-235.
Kyrola, A., et al., "Large-scale graph computation on just a pc, in", Proceedings of the 10th USENIX Symposium on Operating Systems Design and Implementation (OSDI), 2012, pp. 31-46.
Lin, J. et al., "Design patterns for efficient graph algorithms in mapreduce". In Proceedings of the Eighth Workshop on Mining and Learning with Graphs, pp. 78-85. ACM, 2010.
Lloyd, S., "Least squares quantization in PCM. Information Theory", IEEE Transactions on, vol. 28, No. 2, pp. 129-137, 1982.
Louca, S., et al., "MPI-FT:Portable fault tolerance scheme for MPI". Parallel Processing Letters, vol. 10, No. 04, pp. 371-382, 2000.
Low, Y., et al., "Graphlab: A new parallel framework for machine learning", in: Conference on Uncertainty in Artificial Intelligence (UAI), Catalina Island, California, pp. 1-10, 2010.
Malewicz, G., et al., "Pregel: A system for large-scale graph processing", in: Proceedings of the 2010 ACM SIGMOD International Conference on Management of data, ACM, 2010, pp. 135-146.
MPI: A Message-Passing Interface Standard Version 3.0, www.mpi-forum.org/docs/mpi-3.0/mpi30-report.pdf, 2012, pp. 1-822.
Pace, M.F., "BSP vs MapReduce", Procedia Computer Science vol. 9, 2012, pp. 246-255.
Page, L., et al., "The pagerank citation ranking: bringing order to the web". 1999, pp. 1-17.
Potnuru, M., "Automatic out-of-core exceution support for charm++, Master's thesis", University of Illinois at Urbana-Champaign (2003), pp. 1-47.
Rabenseifner, R., et al. "Hybrid mpi/openmp parallel programming on clusters of multi-core smp nodes", in: Parallel, Distributed and Network-based Processing, 2009 17th Euromicro International Conference on, IEEE, 2009, pp. 427-436.
Recht, B., C. R, Parallel stochastic gradient algorithms for large-scale matrix completion, Mathematical Programming Computation, vol. 5, No. 2, 2013, pp. 201-226, doi:10.1007/s12532-013-0053-8, URL http://dx.doi.org/10.1007/s12532-013-0053-8.
Sankaran, S., et al., "The LAM/MPI checkpoint/restart framework: System-initiated checkpointing". International Journal of High Performance Computing Applications, vol. 19, No. 4, pp. 479-493, 2005.
Seo, S., et al., "Hama: An efficient matrix computation with the mapreduce framework", in: Cloud Computing Technology and Science (CloudCom), 2010 IEEE Second International Conference on, IEEE, 2010, pp. 721-726.
Stellner, G., "CoCheck: Checkpointing and process migration for mpi". In Parallel Processing Symposium, 1996., Proceedings of IPPS'96, The 10th International, pp. 526-531. IEEE, 1996.
Valiant, L.G., "A bridging model for parallel computation", Communications of the ACM, vol. 33, No. 8, 1990, 103-111.
Yang, J., et al., "Defining and evaluating network communities based on ground-truth", in: Proceedings of the ACM SIGKDD Workshop on Mining Data Semantics, ACM, 2012, pp. 1-8.
Zaharia, M., et al., "Spark: cluster computing with working sets", in: Proceedings of the 2nd USENIX conference on Hot topics in cloud computing, 2010, pp. 1-7.

* cited by examiner

PARALLEL PROCESSING WITH COOPERATIVE MULTITASKING

CROSS-REFERENCE TO RELATED APPLICATION

The present application is based on and claims the benefit of U.S. provisional patent application Ser. No. 61/872,421, filed Aug. 30, 2013, the content of which is hereby incorporated by reference in its entirety.

This invention was made with government support under IIS 1247632 awarded by the National Science Foundation (NSF). The government has certain rights in the invention.

BACKGROUND

Computing systems that use parallel processing divide a single application into multiple processes that can be performed in parallel on a single computing core or can be performed in parallel on multiple different computing cores. In order to function cooperatively, the parallel processes often need to communicate with each other to pass data and to synchronize their operation. In many parallel computing systems, this communication is achieved using a Message Passing Interface (MPI) library.

MPI is a specification for a library of functions. There are several different implementations of MPI libraries but each implementation adheres to at least one version of the MPI specification. The MPI specifications use objects called communicators and groups to define collections of processes that may communicate with each other. Most MPI functions require a communicator to be specified as an argument and when a communicator is specified for a function, the function is limited to interacting with processes that are part of the communicator and cannot interact with processes outside of the communicator. Each process that is assigned to a communicator is given an identifier referred to as the rank of the process in the communicator, and this rank is required by functions that perform point-to-point communication.

Many of the MPI functions can be divided into blocking and non-blocking functions where a process will stop executing and wait for an event after calling a blocking function while the process will not stop executing after calling a non-blocking function.

Most MPI libraries include at least the following functions: MPI_INIT, MPI_SEND, MPI_RECV, MPI_BARRIER, MPI_BCAST, MPI_REDUCE, and MPI_FINALIZE. MPI_INIT initializes the MPI execution environment. This function must be called in every MPI program, must be called before any other MPI functions and must be called only once in an MPI program. MPI_SEND is a basic blocking send function that sends a message to another process. The function returns only after the buffer containing the message to be sent is free for reuse. MPI_SEND requires the designation of a communicator and the rank of the process that is to receive the message. MPI_RECV is a blocking receive function that will block the process until the requested data is available in a buffer set in the MPI_RECV call. MPI_BARRIER is a synchronization operation that designates a group of processes that must all reach a same synchronization point before any of them can continue. Each process that reaches a MPI_Barrier call blocks until all processes in the group reach the same MPI_Barrier call. Then all of the processes are free to proceed. MPI_REDUCE is a collective computation operation that applies a reduction operation on all processes in a group of processes and places the result in one process known as the root process. MPI_FINALIZE terminates the MPI execution environment. This function should be the last MPI routine called in every process that uses an MPI library—no other MPI routines may be called after it.

The discussion above is merely provided for general background information and is not intended to be used as an aid in determining the scope of the claimed subject matter. The claimed subject matter is not limited to implementations that solve any or all disadvantages noted in the background.

SUMMARY

A method of executing a set of processes includes assigning multiple slave processes and a master process to a node executing an operating system such that the operating system maintains a ready queue comprising a list of one or more processes that are ready to be executed by at least one processing core. A slave process takes an action that causes the operating system to keep the slave process out of the ready queue. Based on receiving an indication that the slave process is to be kept out of the ready queue, the master process sets the slave process to a blocking state, selects a second slave process that is in a runnable state but is currently kept from being in the ready queue, and takes an action that causes the operating system to add the slave process that is in the runnable state to the ready queue.

A parallel processing system includes a computing machine having a master process and a plurality of parallel slave processes assigned thereto. The computing machine is controlled by a scheduler that schedules when processes are executed on at least one processing core of the computing machine. Each slave process is able to indicate that it is waiting for a blocking condition to be satisfied and in response the scheduler excludes the slave process from the scheduled processes. An excluded slave process continues to be excluded from the scheduled processes even after the blocking condition is satisfied until the master process causes the scheduler to schedule the excluded slave process for execution on the at least one processing core.

A computing system includes a processor and memory. The memory holds a list of processes that are scheduled to be executed by the processor such that at least one process stored in memory is in a runnable state but is prevented from being added to the list of processes scheduled to be executed by the processor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
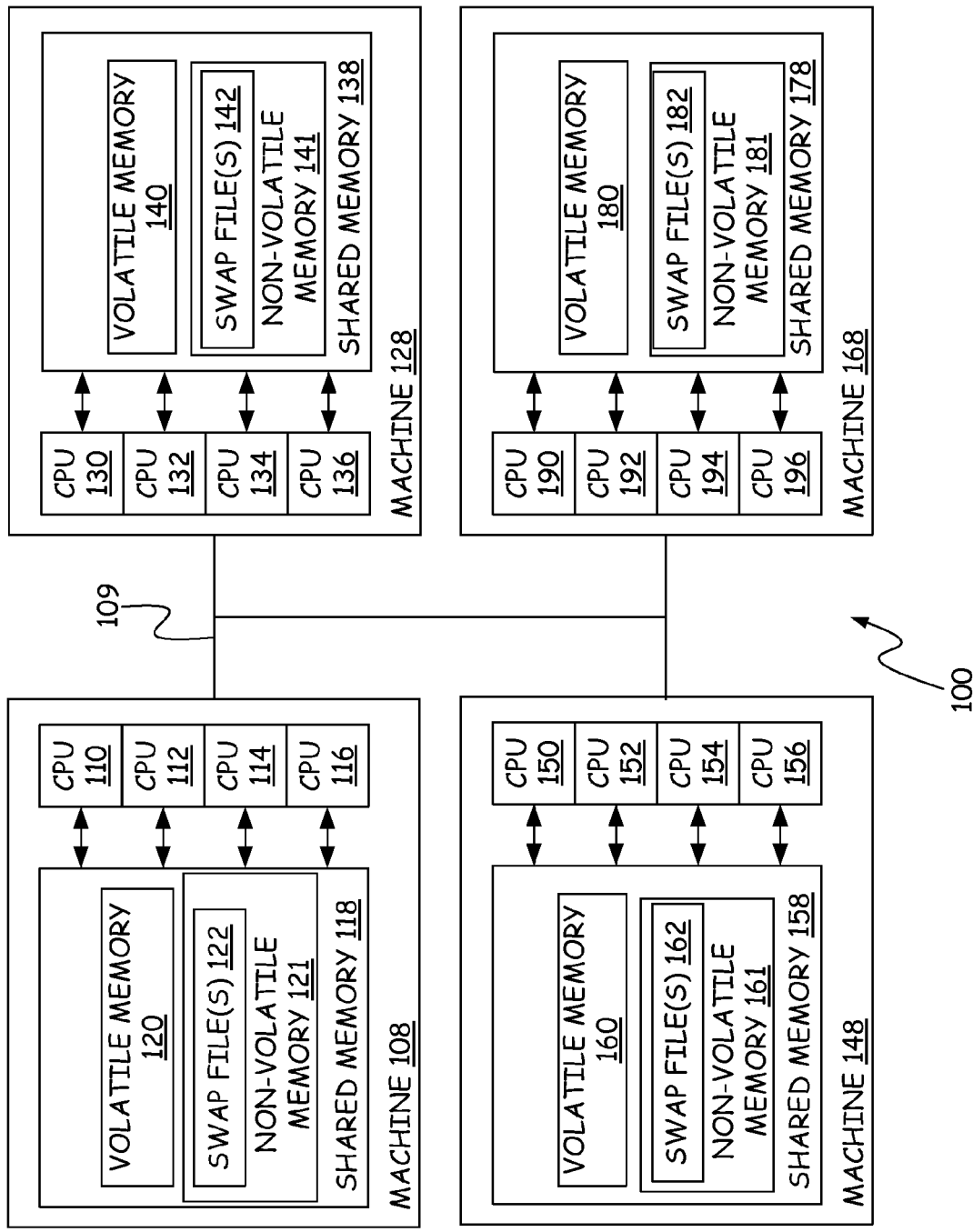
FIG. 1 is a block diagram of an example parallel processing computing environment.

When multiple parallel processes are assigned to a single computing machine referred to as a node, the processes compete for the resources available to the computing core(s) on the node such as volatile memory, disk access and network communications, for example. For applications that work with large data sets, referred to as Big Data, the amount of volatile memory (or other limited resource type) used by the parallel processes assigned to the computing core(s) can exceed the amount of volatile memory (or other resource) available to the computing core(s). When this occurs, the operating system for the node is not able to maintain all of the parallel processes in volatile memory and must place some of the parallel processes in "virtual" memory, which is implemented on a non-volatile memory such as a disk or a solid state drive (SSD).

Most operating systems use some form of multi-tasking in which the operating system maintains a ready queue that provides a list of processes scheduled to be executed on the processing core(s). A process that has been loaded into a processing core will generally be executed until it enters a blocking state or an external interrupt such as an I/O interrupt or a timer interrupt is received. Operating systems will usually add a process to the ready queue if the process is in a runnable state and thus is not waiting for an event or data before it can continue its execution.

The portions of the virtual memory that are accessed by a process that is currently executed on a core, need to be located in the volatile memory to ensure fast operations. When there is not enough available volatile memory for a process that is currently executed by a core, the operating system must "swap out" portions of the volatile memory that is own by that or other processes by writing the contents of the volatile memory to the nonvolatile portion of the "virtual" memory, thereby freeing some of the volatile memory for the currently running process to "swap in" its required portion of the virtual memory.

In the past, the scheduling of parallel processes that together exceed the available volatile memory has resulted in memory "thrashing" where processes are repeatedly swapped in and out of volatile memory. This thrashing is time consuming because it requires a large amount of reading and writing to the nonvolatile memory portion of the virtual memory. In addition, in multi-core processors, the reading and writing can result in delays due to disk access contention problems between the processing cores. To avoid such thrashing and disk access contention delays, some systems have used large volatile memories so that more processes can be loaded in the memory. However, large volatile memories require a considerable amount of energy to operate. As such, large volatile memories are not ideal for devices that have limited power sources such as mobile devices.

Embodiments described below reduce resource contention problems, such as memory thrashing and disk access delays, during parallel computing by implementing a multi-tier system in which a master process ensures that the total amount of resources used by parallel processes in a ready queue is always less than the total amount of resources available to the computing core(s). Thus, even when a parallel process is in a runnable state, the master process prevents the operating system from adding the parallel process to the ready queue when adding the parallel process would cause the total amount of resources needed by the parallel processes in the ready queue to exceed the amount of resources available to the computing core(s).

This execution model is referred to herein as node-level co-operative multi-tasking. The model allows only up to a set number of processes to be executing concurrently with the rest of the processes blocking. When a running process reaches a blocking operation, it is blocked and the master selects a previously blocked but now runnable process (i.e., whose blocking condition has been satisfied) to resume execution.

The memory model of the embodiments described below is based on constrained memory over-subscription. This model allows the aggregate amount of memory required by all parallel processes spawned on a node to be greater than the amount of physical memory on that node. However, the model requires that the sum of the memory required by the concurrently running processes to be smaller than the amount of physical memory on that node. Within this model, an application in accordance with one embodiment will rely on an operating system's virtual memory management mechanisms to map in memory the data that each process needs during its execution. In other embodiments, the application can be explicitly optimized for the execution model and memory model described below. In particular, an application can be optimized to use memory locking/unlocking to prefetch from the swap file and subsequently release the parts of the address space that it needs or use file I/O to explicitly load/store the data that it needs from the disk and thus bypass most of the virtual memory management mechanisms.

The coupling of constrained memory over-subscription with node-level co-operative multi-tasking allows the embodiments to efficiently execute an unmodified program whose aggregate memory requirements far exceed the aggregate amount of physical memory in the node. This is due to the following two reasons. First, it allows the processes to amortize the cost of loading their data from the disk over the longest possible uninterrupted execution that they can perform until they need to block. Second, it prevents memory thrashing because each node has a sufficient amount of physical memory to accommodate all the processes that are allowed to run.

FIG. 1 provides a block diagram of a cluster 100 of computing machines that are used in one embodiment of a parallel/distributed computing system. Cluster 100 includes computing machines or nodes 108, 128, 148, and 188, which are connected together by a network 109. Node 108 includes processing cores or central processing units (CPUs) 110, 112, 114, and 116 and shared memory 118. Shared memory 118 includes a volatile memory 120, which in some embodiments is a dynamic random access memory (DRAM), and a nonvolatile memory 121, which is either a disc-based nonvolatile memory or a solid state device. Nonvolatile memory 121 contains swap files 122 that together with nonvolatile memory 120 form virtual memories for processing cores 110, 112, 114 and 116. Shared memory 118 is shared between processing cores 110, 112, 114 and 116. Although multiple processing cores are shown in node 108, in other embodiments, a single processing core is present in node 108 and memory 118 is dedicated to the single processing core.

Nodes 128, 148 and 168 include similar elements to node 108 with node 128 having processing cores 130, 132, 134, and 136 and shared memory 138 with volatile memory 140 and non-volatile memory 141. Node 148 has processing cores 150, 152, 154, and 156 and shared memory 158 with volatile memory 160 and non-volatile memory 161. Node 168 has processing cores 190, 192, 194, and 196 and shared memory 178 with volatile memory 180 and non-volatile memory 181. Volatile memories 141, 161, and 181 contain swap files 142, 162 and 182, respectively that together with nonvolatile memories 140, 160, and 180, respectively, form virtual memories for the processing cores. Although multiple processing cores are shown on each of nodes 128, 148 and 168, in other embodiments, one or more of machines 128, 148 and 168 may be limited to a single processing core and a dedicated memory for that processing core.

Although not shown, nodes 108, 128, 148 and 168 also include network communication interfaces that allow the processing cores on one node to communicate with the processing cores on one or more other nodes over network 109.

Volatile memories 120, 140, 160 and 180, also referred to as physical memories, can be any form of memory that can be quickly accessed by the processing core and that requires energy in order to maintain its memory states. Examples of volatile memory include random access memories (RAM) such as dynamic random access memory (DRAM) and static random access memory (SRAM).

Figure 2:
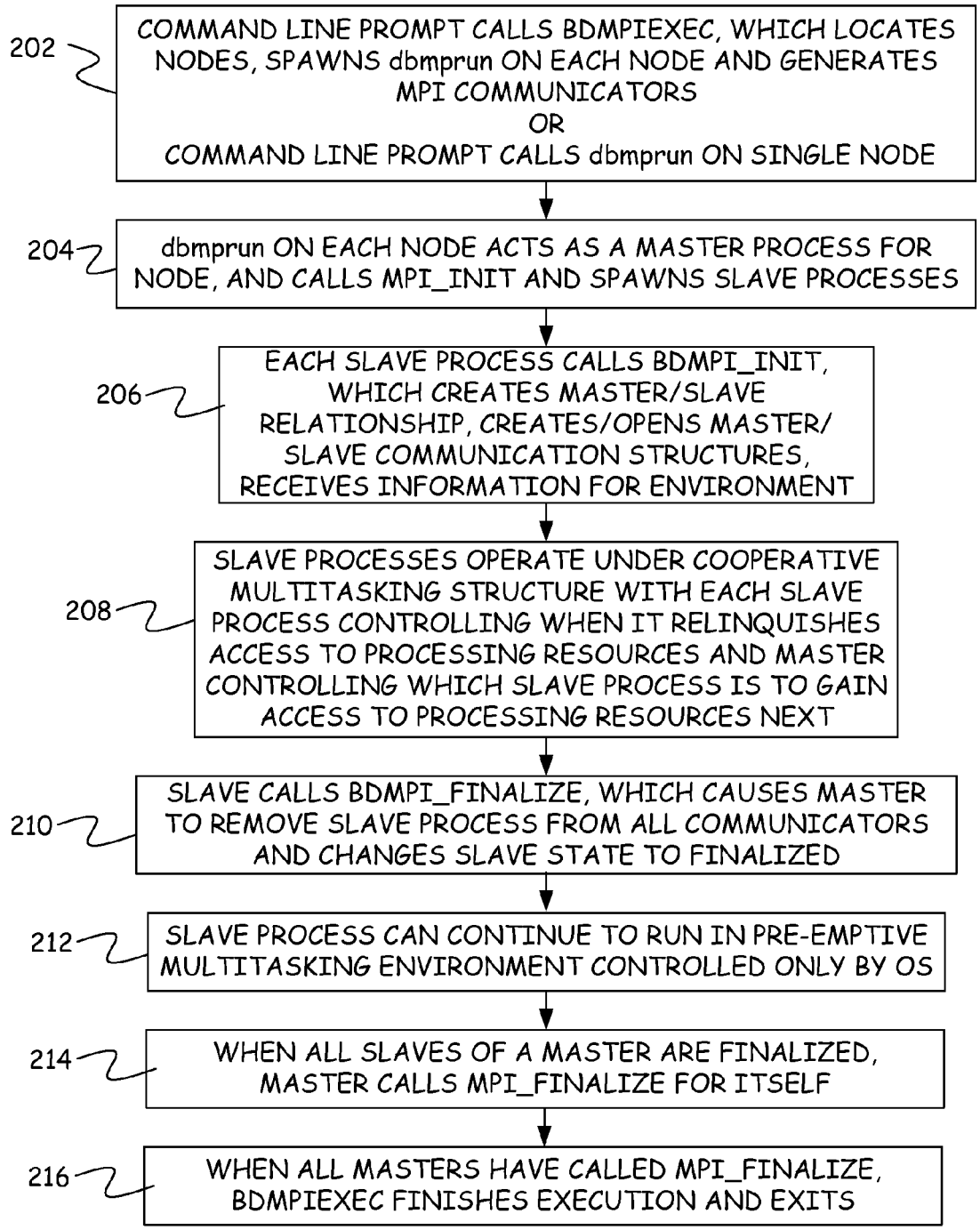
FIG. 2 is a flow diagram of a method of executing parallel processes in accordance with one embodiment.
Figure 3:
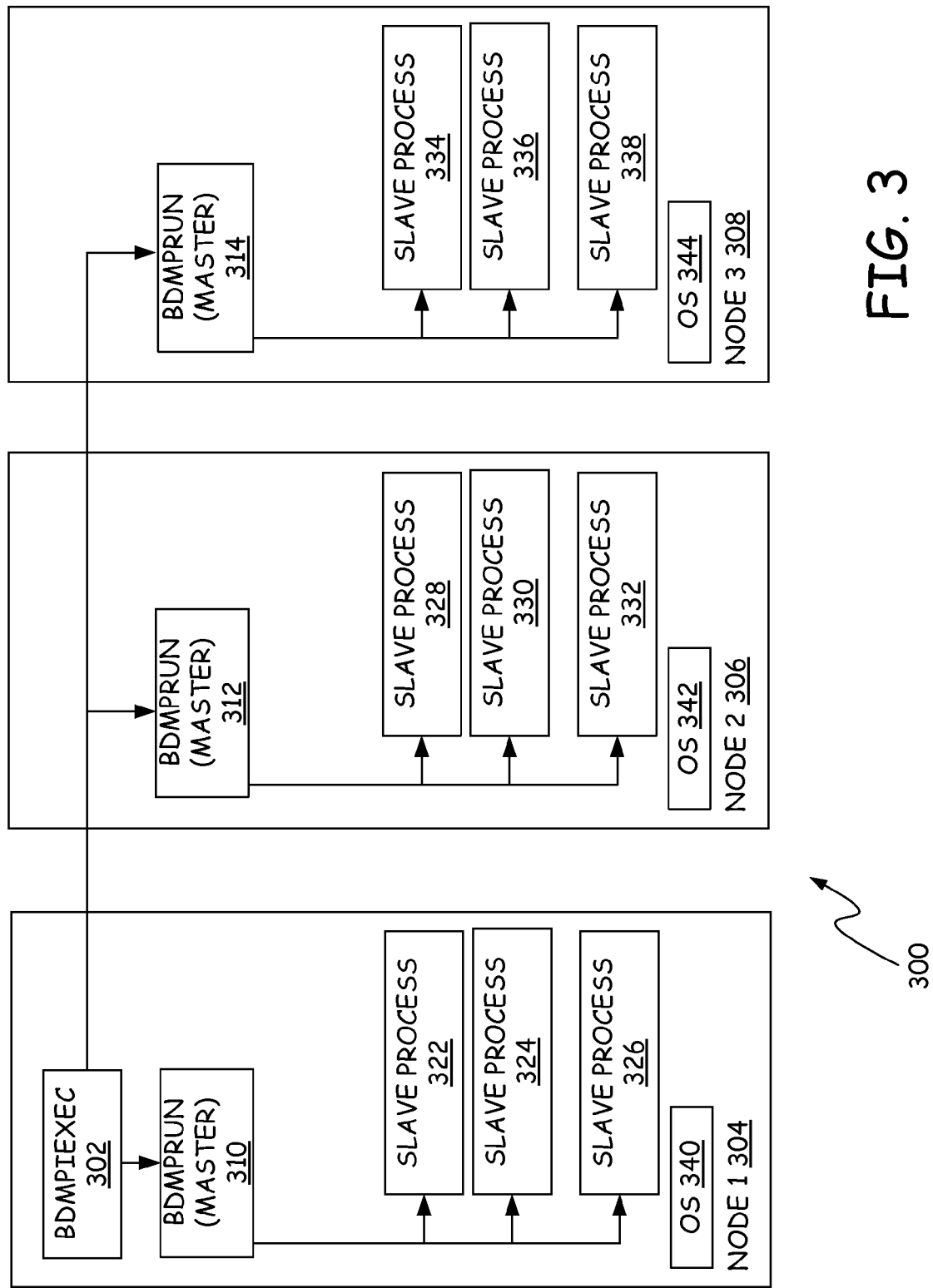
FIG. 3 is a block diagram of multi-node environment for executing parallel processes in accordance with one embodiment.
Figure 4:
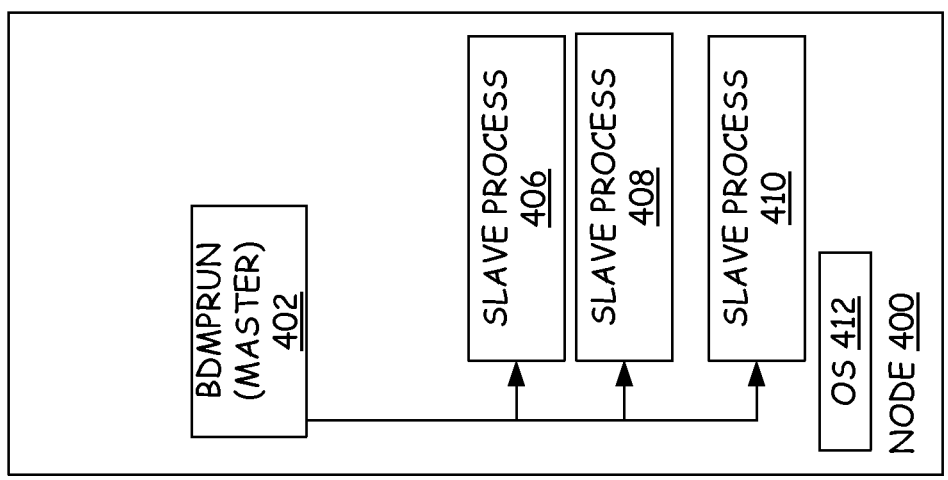
FIG. 4 is a block diagram of a single node environment for executing parallel processes in accordance with one embodiment.

FIG. 2 provides a flow diagram of a method of executing parallel processes in accordance with one embodiment. FIGS. 3 and 4 provide simplified block diagrams of processes used in the flow diagram of FIG. 2. FIG. 3 provides a multi-node embodiment and FIG. 4 provides a single node embodiment. At step 202, which is applicable to the multi-node embodiment only, BDMPIEXEC 302 begins execution on node 304. Although BDMPIEXEC 302 is shown to be executed on node 304, BDMPIEXEC 302 could be executed on any of nodes 304, 306, and 308 or on another node. In accordance with one embodiment, BMPIEXEC is called through a command line prompt of:

| BDMPIEXEC | -nn nnodes |
| | -ns nslaves |
| | -nr nrunning |
| | progname [arg1] [arg2] . . . | where nnodes is the number of computer nodes to use for execution, nslaves is the number of parallel process that are to be spawned on each node, nrunning is the maximum number of parallel processes that are allowed to be in the ready queue of each node, and progname [arg1] [arg2] . . . is the name of the parallel program to be executed as the parallel process together with the arguments of the parallel program.

In step 202, BDMPIEXEC 302 locates the number of nodes designated in the command line. BDMPIEXEC 302 also spawns an instance of bdmprun on each node producing bdmprun instances 310, 312 and 314 in FIG. 3. If there is more than one node specified in the command prompt, BDMPIEXEC 302 also generates a Message Passing Interface (MPI) communicator that includes bdmprun instances 310, 312, and 314. This communicator is used to pass messages between master processes discussed further below. When spawning bdmprun instances 310, 312, and 314, BDMPIEXEC 320 passes the number of parallel processes that are to be spawned on each node, the maximum number of parallel processes that are to be allowed in the ready queue at any one time and the name and parameters of the parallel program to be executed as the parallel processes.

Alternatively, in an embodiment with a single node as shown in FIG. 4, step 202 involves calling bdmprun 402 from a command line prompt as:

| bdmprun | -ns nslaves |
| | -nr nrunning |
| | progname [arg1] [arg2] . . . | where nslaves is the number of parallel process that are to be spawned on the node, nrunning is the maximum number of parallel processes that are allowed to be in the ready queue of the node, and progname [arg1] [arg2] . . . is the name of the parallel program to be executed as the parallel processes together with the arguments of the parallel program. This creates an instance 402 of dbmprun on node 400.

Each instance of bdmprun acts as a master process for the node it is executed on and is referred to as a master process hereinafter. In accordance with one embodiment, each master process is a parallel program written in MPI. Although only a single master is shown on each node, in other embodiments, multiple masters may be run on each node. At step 204, each master process 316, 318, 320 and 404 calls MPI_INIT, which is a function used to initialize a Message Passing Interface (MPI) environment. For the multi-node embodiment of FIG. 3, this MPI environment allows master processes 316, 318, and 320 to communicate with each other across nodes 304, 306 and 308.

Each master process then spawns the number of parallel processes set in either the call to BDMPIEXEC 302 or in the call to bdmprun 402 using the nslaves parameter. Each parallel process is referred to hereinafter as a slave process such as slave processes 322, 324 and 326 of node 304, slave processes 328, 330 and 332 of node 306, slave processes 334, 336 and 338 of node 308 and slave processes 406, 408 and 410 of node 400. Although three slave processes are shown in FIGS. 3 and 4, those skilled in the art will recognize that any number of desired slave processes may be set in the calls to BDMPIEXEC 302 and dbmprun 402.

At step 206, each slave process calls an instance of MPI_INIT provided by a MPI library included in each slave process. The MPI library in each slave process is a specialized implementation of MPI developed for the present embodiments and is referred to hereinafter as the Big Data Message Passing Interface (BDMPI) library. Although the slave processes call the MPI functions in this specialized MPI library using standard MPI function names such as MPI_INIT, MPI_SEND, MPI_RECEIVE, MPI_BROADCAST, MPI_REDUCE, and MPI_FINALIZE, in the discussion below, these function names will be prepended with BD to indicate that they are an instance of an MPI function that was created as part of the present embodiments. Thus, the MPI_INIT function developed for the present embodiments will be referred to as BDMPI_INIT, and the MPI_SEND function developed for the present embodiments will be referred to as BDMPI_INIT, for example.

In some embodiments, the BDMPI library implements all of the functions of a MPI specification while in other embodiments, the BDMPI library implements a subset of the functions. For example, in accordance with one embodiment, the BDMPI library implements a subset of the MPI 3 specification including the following functions:

BDMPI_Init, BDMPI_Finalize
BDMPI_Comm_size, BDMPI_Comm_rank, BDMPI_Comm_dup,
BDMPI_Comm_free, BDMPI_Comm_Split
BDMPI_Send, BDMPI_Isend, BDMPI_Recv, BDMPI_Irecv, BDMPI_Sendrecv
BDMPI_Probe, BDMPI_Iprobe, BDMPI_Test, BDMPI_Wait, BDMPI_Get_count
BDMPI_Barrier
BDMPI_Bcast, BDMPI_Reduce, BDMPI_Allreduce, BDMPI_Scan,
BDMPI_Gather[v], BDMPI_Scatter[v], BDMPI_Allgather[v], BDMPI_Alltoall[v].

The call to BDMPI_INIT made by each slave process creates a master/slave relationship between the slave process and the instance of dbmprun that spawned the slave process. The BDMPI_INIT function also creates/opens master/slave communication structures that allow the master and slave to exchange messages including message queues and a shared memory. Lastly, the BDMPI_INIT function provides information about the environment to the slave process such as the available communicators in the environment.

BDMPI's master processes coordinate the activity of their associated slave processes by using operating system supplied mechanism for inter-process communication and synchronization. In accordance with one embodiment, BDMPI uses POSIX message queues to achieve this synchronization. According to this embodiment, each slave process has a message queue, referred to as go-queue, which is used by the slave and master processes to synchronize.

After calling BDMPI_INIT at step 206 of FIG. 2, each slave process enters a blocking state by notifying master process 620 of the blocking state and attempting to read an empty go-queue 622 (FIG. 6, described below) associated with the slave process. When a slave process attempts to read from an empty go-queue 622, a processing core stops executing the slave process and the operating system saves the execution state of the slave process in volatile memory. The operating system also prevents the blocked slave process from being added to ready queue until the go-queue is written to as discussed further below.

The master process maintains a state for each slave process. The possible states include: running (the operating system is allowed to place the slave in the ready queue, the slave is in the ready queue or the slave is being executed), cblocked (the slave is blocked due to a BDMPI collective operation), rblocked (the slave is blocked due to a BDMPI receive operation), runnable (all BDMPI blocking conditions for the slave are satisfied but the operating system is not allowed to place the slave in the ready queue), and finalized (the slave has called BDMPI_Finalize). The reason for the differentiation between the rblocked and cblocked states is because messages can arrive in a different order than the corresponding calls to BDMPI_Recv are made, whereas collective communication operations can only finish in the order in which they are called. At step 206e, master process 620 sets each slave process state 624 to "runnable" such that any of the slave processes may be selected by the master to be added to the ready queue.

All communication/synchronization operations between the slaves go via their master processes. These operations are facilitated using POSIX shared memory for master/slave bi-directional data transfers, POSIX message-queues for slave-to-master and master-to-slave signaling, and MPI operations for intra-node communications/synchronization. For example, if a message is sent between two MPI processes $p_i$ and $p_j$ that are mapped on nodes $n_x$ and $n_y$, then the communication will involve processes $p_i \rightarrow m_x \rightarrow m_y \rightarrow p_j$, where $m_x$ and $m_y$ are the master processes running on nodes $n_x$ and $n_y$, respectively. Process $p_i$ will signal $m_x$ that it has a message for $p_j$ and transfer data to $m_x$ via shared memory (assuming the message is sufficiently small), $m_x$ will send the data to $m_y$ via an MPI_Send operation, and $m_y$ will send the data to $p_j$ via shared memory.

In other embodiments, the communication/synchronization operations between the slaves are split such that part of the operation occurs using the communication path through the masters described in the preceding paragraph and part of the operation occurs using a direct slave-to-slave communication path. In one particular embodiment, the communication/synchronization operations are divided into three components with the first and the third components using the communication path through the master processes and the second component using a direct slave-to-slave communication path. This embodiment allows for direct slave-to-slave communication/synchronization in order to facilitate faster communication and/or remove unnecessary data copying/buffering. The first and third components are used to allow the master processes to properly update the state of the system before and after the slave-to-slave operation has been performed. Moreover, depending on the specific operation, one or two of the above steps can be optional.

In accordance with one embodiment, the master processes service the various MPI operations by spawning different POSIX threads for handling them. In most cases, the lifetime of these threads is rather small, as they often involve updating various master state variables and moving small amounts of data from the slave's address space to the master's address space and vice versa. The only time that these threads can be alive for a long time is when they perform blocking MPI operations with masters of other nodes. The multi-threaded implementation of the master processes improves the efficiency in handling requests from different slaves and other master processes. It also ensures that collective operations involving multiple disjoint subsets of slave processes across different nodes can proceed concurrently.

At step 208, each of the slave processes on each node operate under a cooperative multitasking structure with each process controlling when it relinquishes access to the ready queue of the node and thus when it relinquishes access to the resources available to the processing cores such as volatile memory and disk access. The master process controls which slave process will be allowed to be added to the ready queue next such that even though a slave process is in a runnable state and its blocking condition has been satisfied, the operating system on the processing node, such as operating systems (OS) 326, 342, 344, and 412, is prevented from adding the slave process to the ready queue until the master indicates that the slave process is to be added to the ready queue. In this cooperative multitasking structure, the slave processes and the master process together ensure that the amount of resources used by the slave processes that are currently in the ready queue or are currently being executed by the processing core(s) do not exceed the amount of resources available to the processing core(s). In some embodiments, the number of slave processes that are currently in the ready queue or are currently being executed is limited to the maximum number of processes specified in the call to BDMPIEXEC 302 or dbmprun 402 as the nrunning parameter.

Given the embodiment's execution and memory model, it can be seen that the optimal number for the nrunning parameter is determined by the number of physical cores on the nodes, the ability of the disk subsystem to service concurrent requests, and the amount of memory required by each parallel process. Among these parameters, the disk subsystem is often the rate limiting component and its ability to allow for more running processes depends on the number of spinning disks and/or the use of solid-state devices (SSDs).

As the slave processes are executed, they call various BDMPI functions to send messages to other slave processes, receive messages from other slave processes, broadcast messages to groups of slave processes, synchronize with other slave processes and perform collective functions as discussed further below. When a slave process has completed the parallel portion of its operation, it calls BDMPI_FINALIZE at step 210, which causes the slave's master process to remove the process from all communicators and changes the state of the slave to "Finalized."

At step 212, a slave process that has called BDMPI_FINALIZE can continue to execute in a pre-emptive multitasking environment controlled only by the operating system. In this environment, the decision of when to add the slave process to the ready queue is controlled by the operating system and the master process cannot limit when the slave process is eligible to be placed in the ready queue.

At step 214, all of the slave processes have finished their parallel operations and have all called BDMPI_FINALIZE. In response, the master process calls MPI_FINALIZE, which causes the master process to be removed from the communicator, if any, established for the master processes by BDMPIEXEC. At step 216, when all of the master processes have called MPI_FINALIZE, BDMPIEXEC finishes execution and exits.

Figure 5:
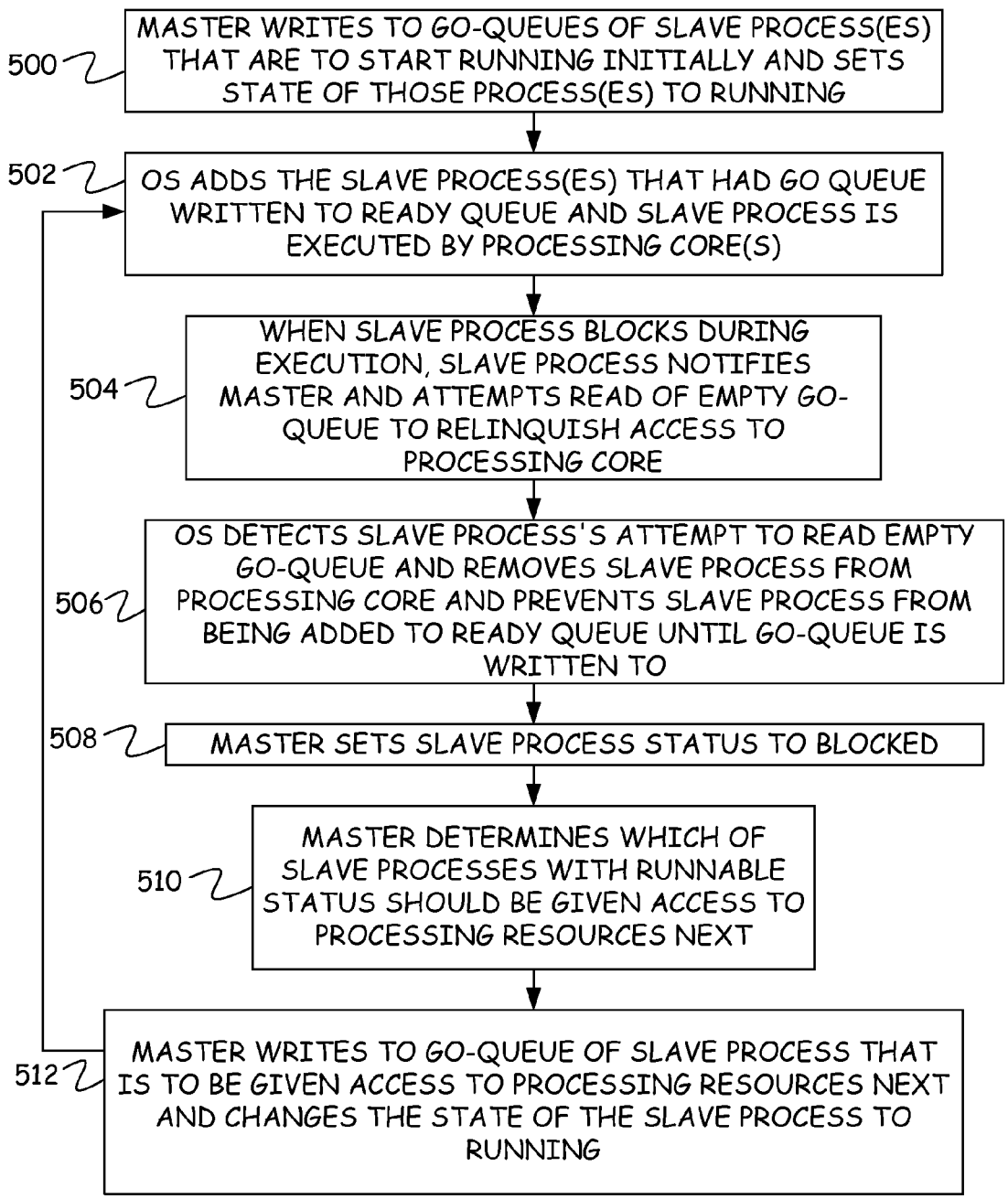
FIG. 5 is a flow diagram of a method of implementing cooperative multitasking among parallel processes in accordance with a first embodiment.
Figure 6:
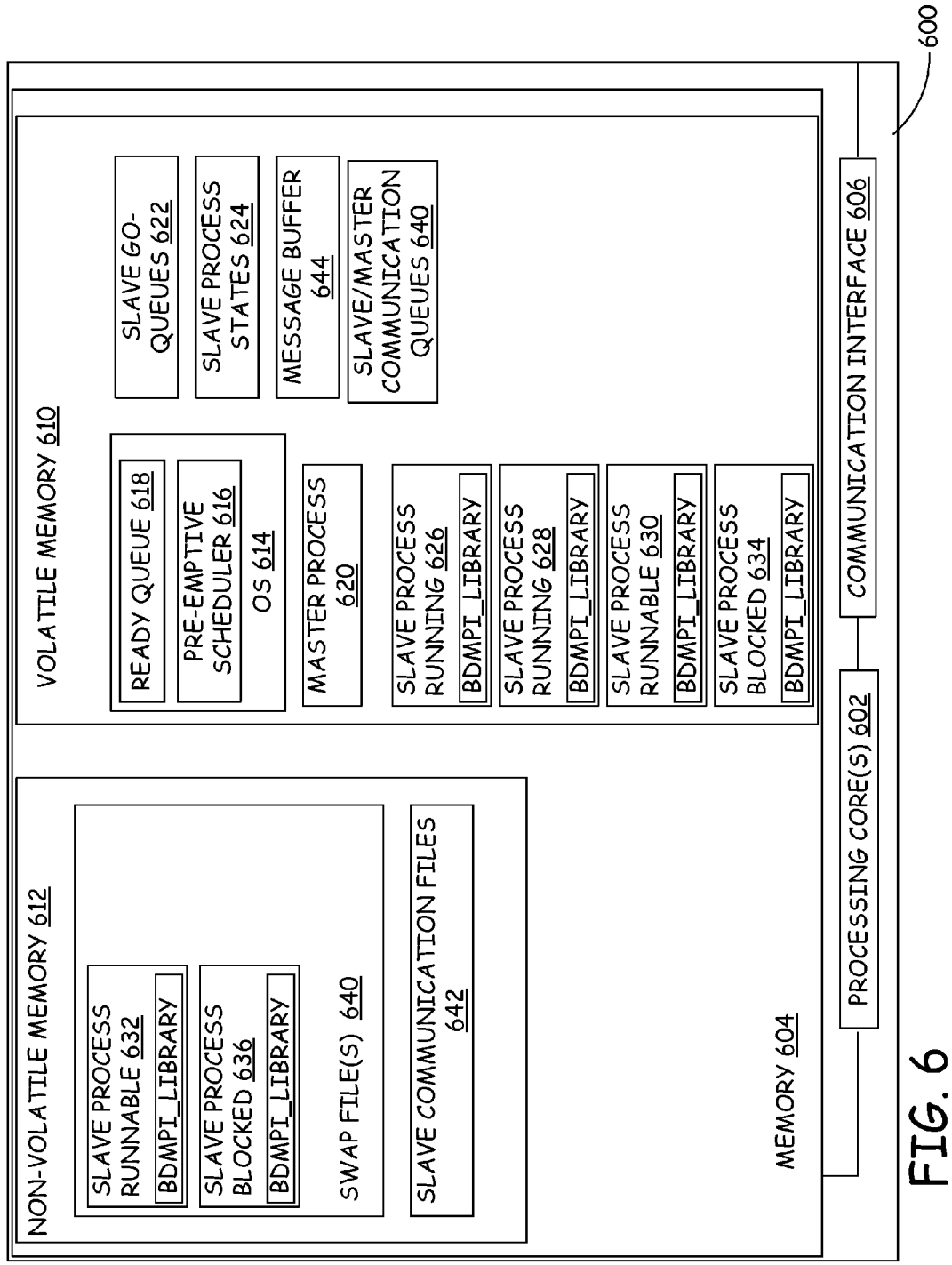
FIG. 6 is a block diagram of a single node used in the embodiment of FIG. 5.

FIG. 5 provides a more detailed flow diagram of the cooperative multitasking implemented in step 208 of FIG. 2. FIG. 6 provides a block diagram of a node showing elements used in the method of FIG. 5. In FIG. 6, a node 600 includes one or more processing core(s) 602, a memory 604 and a communication interface 606. Communication interface 606 allows processes executed on processing core(s) 602 to send messages to and receive messages from processes operating on other nodes.

Memory 604 is divided into a volatile memory 610 and a nonvolatile memory 612. In FIG. 6, volatile memory 610 takes the form of dynamic random access memory (DRAM) although other volatile memories may be used. Volatile memory 610 holds an operating system kernel (OS) 614 that includes a pre-emptive scheduler 616 and a ready queue 618 that is populated by scheduler 616 and includes a list of processes that are to be executed on processing core(s) 602. Ready queue 618 may be implemented as a single queue for all processing core(s) or may be implemented as separate queues with one queue for each processing core. A processing core 602 will stop executing a process when the process enters a blocking state or when the processing core 602 receives an interrupt such as an I/O interrupt, a timer interrupt, for example. When one of these events occurs, operating system kernel 614 copies the state of the process currently being executed by the processing core 602 from the registers of the processing core 602 into volatile memory 610 and loads the execution state of the next process in ready queue 618 into the registers of the processing core 602.

At step 500 of the cooperative multitasking, master process 620 writes to the go-queues 622 of the slave processes that are to start running initially. Although go-queues 622 are shown collectively in FIG. 6, a separate go-queue is provided for each slave. The number of slave processes that are to start running initially is limited to the maximum number of processes that are allowed to be in the ready queue at any one time as set by the nrunning parameter in the call to bdmprun 402 or BDMPIEXEC 302. This maximum number is selected to ensure that the amount of resources such as volatile memory, required by all of the slave processes that are allowed to be placed in the ready queue is less than the amount of resources available to the processing core(s) 602. After writing to the go-queues 622 of some of the slave processes, master process 620 changes the state of those processes to "running" from "runnable". This produces slave processes in different states such a slave processes 626 and 628 that are in a running state and slave processes 630 and 632 that are in a runnable state. As shown in FIG. 6, both of running slave processes 626 and 628 and runnable slave process 630 are in volatile memory 610 while runnable slave process 632 is in swap file(s) 640 of nonvolatile memory 612.

At step 502, pre-emptive scheduler 616 of operating system kernel 614 detects that the go-queues 622 of the blocked processes have been written to and for each process that has had its go-queue 622 written to, scheduler 616 adds the process to ready queue 618. Operating system 614 loads the processes in ready queue 618 into processing core(s) 602 as processing core(s) 602 become available thereby allowing the processes to be executed by processing core(s) 602. If operating system kernel 614 is using pre-emptive multitasking, a slave process may be transferred back and forth between the processing core(s) 602 and ready queue 618 several times before reaching a blocking state if I/O or timer interrupts are received while the slave process is executing.

In step 504, when a slave process blocks during execution, the slave process notifies master process 620 through slave/master communication queue 640 and attempts to read an empty go-queue 622 to relinquish access to processing core(s) 602.

At step 506, operating system kernel 614 detects that the slave process has attempted to read an empty go-queue 622 and removes the slave process from a processing core 602 and prevents the slave process from being added to the ready queue 618 until go-queue 622 for the slave process is written to. Thus, the slave process is prevented from gaining access to the processing resources available to processing core(s) 602. Operating system kernel 614 will also designate the slave process as being eligible for being removed from volatile memory 610 and into non-volatile memory 612 if another process requires space on volatile memory 610.

At step 508, the master sets the blocked slave process to a state of blocked. Examples of such blocked slave processes are shown as processes 634 and 636 in FIG. 6. As shown in FIG. 6, blocked slave process 634 is in volatile memory will blocked slave process 636 is in swap files 638 of nonvolatile memory 612. At step 510, master process 620 determines which of the slave processes with a runnable state should be given access to the processing resources next. In accordance with one embodiment, master process 620 examines all of the slave process states 624 to identify multiple slave processes that are in a runnable state. A slave process will be in a runnable state when the blocking condition it has been waiting for is satisfied such as when a message is received or other processes have reached a synchronization barrier, for example but master process 620 has yet to write to the go-queue of the slave process. When multiple slave processes are in a runnable state, master process 620 selects one of the multiple runnable slave processes to place in the running state. In accordance with one embodiment, master process 620 selects the slave process with the highest percentage of its instructions and data currently loaded in volatile memory 610. By selecting such a slave process, master process 620 reduces the amount of data that will need to be copied from non-volatile memory 612 and into volatile memory 610.

At step 512, master process 620 writes to go-queue 622 of the selected slave process that is to be given access to the processing resources next and changes the state of that slave process to running in slave process states 624. The method of FIG. 5 then returns to step 502 where the operating system places the process that has had its go-queue written to on ready queue 618. Before the slave process is added to ready queue 618, operating system 614 copies the slave process into volatile memory 610 if part or all of the slave process currently resides on non-volatile memory 612.

Because operating system 614 is unable to add a slave process to ready queue 618 until master process 620 writes to the go-queue 622 of the slave process, master process 620 is able to limit the number of slave processes that are in ready queue 618. Thus, even though a slave process is in a runnable state and is not waiting for an event that it had previously blocked on, the slave process is prevented from being placed in ready queue 618 by master process 620. This allows master process 620 to ensure that the amount of resources used by the slave processes in ready queue 618 does not exceed the resources available to processing core(s) 602. In one particular embodiment, master process 620 is able to ensure that the amount of volatile memory required by the slave processes in ready queue 618 is less than the amount of volatile memory assigned to processing core(s) 602. This allows operating system 614 to use pre-emptive multitasking without incurring memory thrashing and without incurring disk contention delays due to competing parallel processes. As a result, master process 620 and the slave processes 626, 628, 630, 632, 634 and 636 improve the efficiency of parallel computing.

Figure 7:
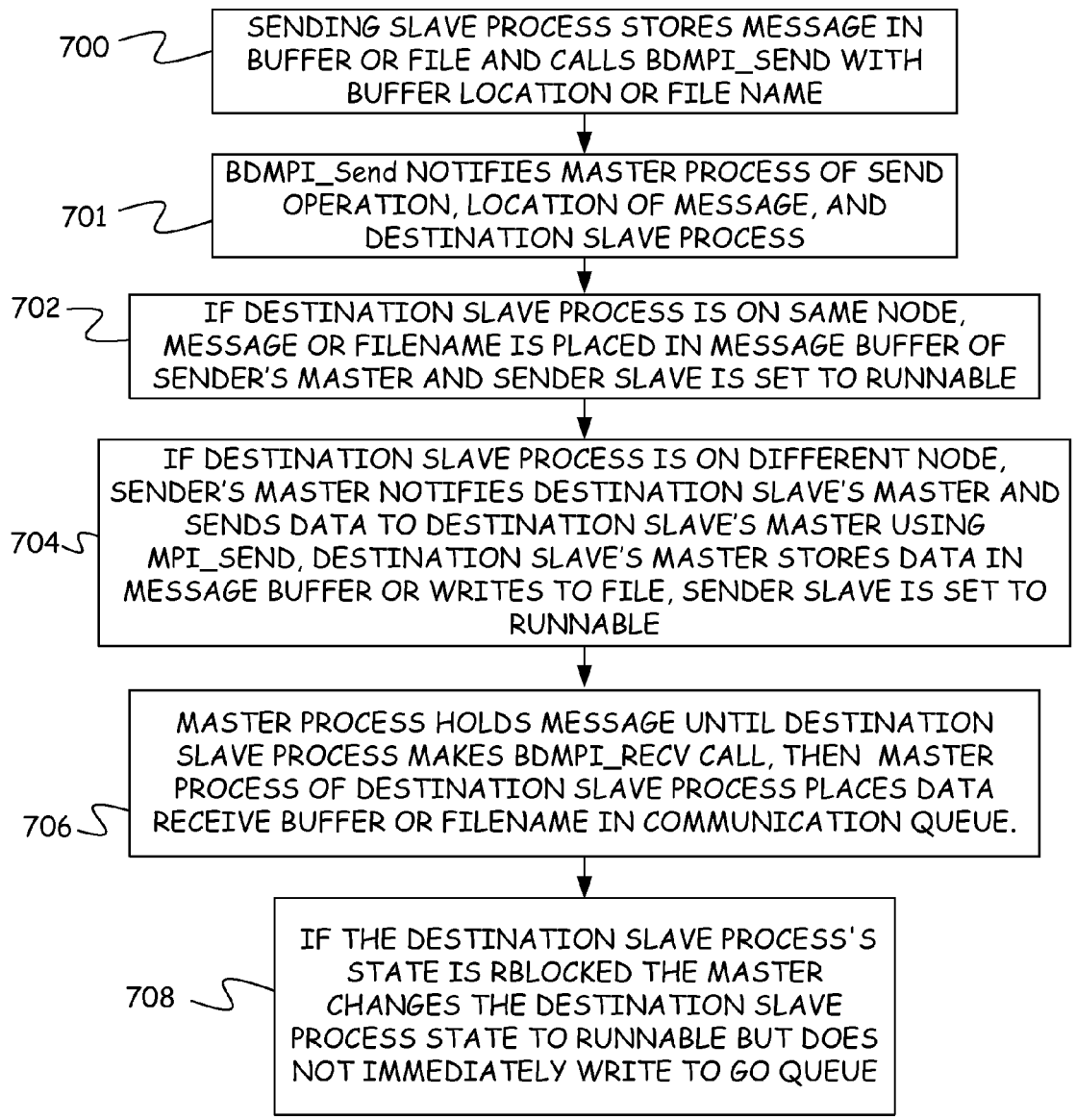
FIG. 7 is a flow diagram of a method of performing a BDMPI_Send function.

FIG. 7 provides a flow diagram for a BDMPI_Send operation which is a version of the MPI_Send function implemented in the BDMPI library. The BDMPI_Send operation is performed using a buffered send approach. This is done in order to allow the sending process, once it has performed the necessary operations associated with buffering, to proceed with the rest of its computations. The advantage of this approach is that it maximizes the amount of time over which the running process can amortize the time it spent to establish memory residency.

At step 700 of FIG. 7, the sending slave process stores the message in slave/master shared memory 646 in volatile memory 610 if the message will fit in shared memory 646 or writes the message to a slave communication file 642 in nonvolatile memory 612 if the message is too large for shared memory 646. In accordance with one embodiment, messages that are 4 k Bytes or less are placed in shared memory 646 and all other messages are placed in slave communication file 642. The slave process then calls BDMPI_Send with the buffer location or filename, an identifier of the communicator for the send operation and the rank or id of the destination slave process in the communicator.

At step 702, BDMPI_Send notifies master process 620 of the send operation, the location of the message to be sent, the communicator and the destination slave process.

At step 702, if the destination slave process is on the same node as the sending slave process and the message was placed in shared memory 646, master process 620 copies the message out of shared memory 646 and into message 644 associated with master process 620 so as to free the shared memory. This allows master process 620 of the sender slave process to place the sender slave process into a runnable state.

At step 704, if the destination slave process is on a different node than the sender slave process, the sender's master process 620 notifies the destination slave's master process and sends the message to the destination slave's master process using MPI_Send. Note that MPI_Send is a standard implementation of the MPI_Send function. The destination slave's master 620 stores the data in its message buffer 644 or writes the data to a file in slave communication file 642 if the message is too large for message buffer 644.

At step 706, master process 620 of the destination slave holds the message until the destination slave makes a BDMPI_Recv call. Master process 620 of the destination slave process then determines if the message is in message buffer 644 or was written to slave communication files 642. If the message is in message buffer 644, the message is transferred to a receive buffer designated by the destination slave process in its BDMPI_Recv call. If the message was written to slave communication files 642, master process 620 writes the filename to slave/master communication queue 640. If the destination slave process is in a running state, it remains in the ready queue and continues its execution.

If, at step 708, the destination slave process is in a rblocked state, master process 620 changes the destination slave process state to runnable but does not immediately write to the go-queue of the destination slave process. As such, even though the destination slave process has received the data it is waiting for, it is not immediately eligible to be added to ready queue 618.

BDMPI_Send is a blocking version of a send operation. The present embodiments also provide for a non-blocking version referred to as BDMPI_Isend. The only different between BDMPI_Send and BDMPI_Isend is that the sender's slave is set to runnable at step 700 in the BDMPI_Isend function instead of being set to runnable at steps 702 and 704.

Figure 8:
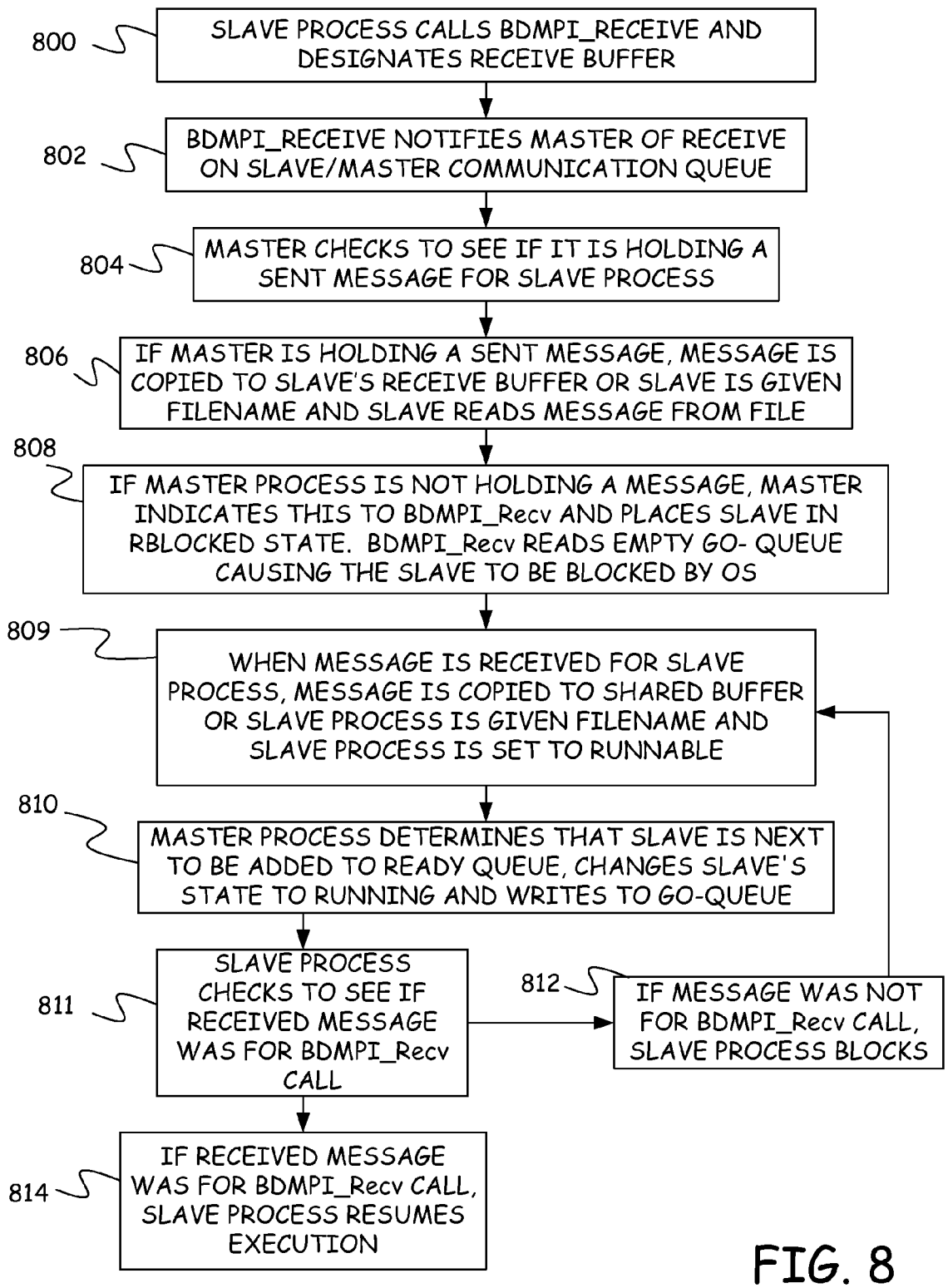
FIG. 8 is a flow diagram of a method of performing a BDMPI_Recv function.

FIG. 8 provides a flow diagram of a method of performing a BDMPI_Recv operation. At step 800, a slave process calls BDMPI_Recv and designates a receive buffer in shared memory 646. At step 802, BDMPI_Recv notifies master process 620 of the receive operation on slave/master communication queue 640. At step 804, master process 620 checks to see if it is holding a sent message for the slave process in message buffer 644 or slave communication file 642. At step 806, if the master process is holding a sent message for the slave process, the data is copied to the slave's receive buffer or the slave is given the filename through slave/master communication queue 640 and the slave process reads the message from the file. The slave process remains in volatile memory and continues to alternate between being executed by a processing core 602 and being placed on ready queue 618.

At step 808, if master process 620 is not holding a sent message for the slave process, the master process indicates this to BDMPI_Recv through the slave/master communication queue 640 and then places the slave process in a rblocked state. The BDMPI_Recv function then reads from an empty go-queue 622 causing the slave process to be blocked by operating system kernel 614 such that the slave process is removed from processing core 602 and prevented from being placed in ready queue 618.

At step 809, when a message is received by master process 620 for a slave process that is rblocked, master processes 620 copies message to slave's receive buffer in shared memory 646 or provides filename of slave communication file 642 that contains message in communication queue 640. Master process 620 then sets the state of the slave processes to runnable.

At step 810, master process 620 receives an indication that another slave process has blocked and selects the slave process that was the destination of the received message to be added to the ready queue 618. It changes the state of the slave processes to running and writes to the slave process's go-queue.

At step 811, the receiving slave process checks to see if the received message was for the BDMPI_Recv call. If the received message was not for the BDMPI_Recv call, the slave process blocks again and attempts to read from the go-queue at step 812. The method of FIG. 8 then returns to step 809.

At step 814, if the received message was for the BDMPI_Recv call, the receiving slave process resumes execution.

Note that the protocol above is required because BDMPI's master processes 620 do not maintain information about the posted receive operations but instead only maintain information about the send operations.

For simplicity, BDMPI's implementation of the BDMPI_Irecv, the non-blocking version of the receive operation, does nothing other than setting the status information and uses an implementation similar to that for BDMPI_Recv when the corresponding BDMPI_Wait operation is invoked.

It can be shown that the above protocol ensures as long as the program is deadlock free based on MPI's point-to-point communication semantics, its BDMPI execution will also be deadlock free. However, since BDMPI uses buffered sends, the reverse is not true. That is, a deadlock-free BDMPI program will not necessarily be a deadlock-free MPI program.

Figure 9:
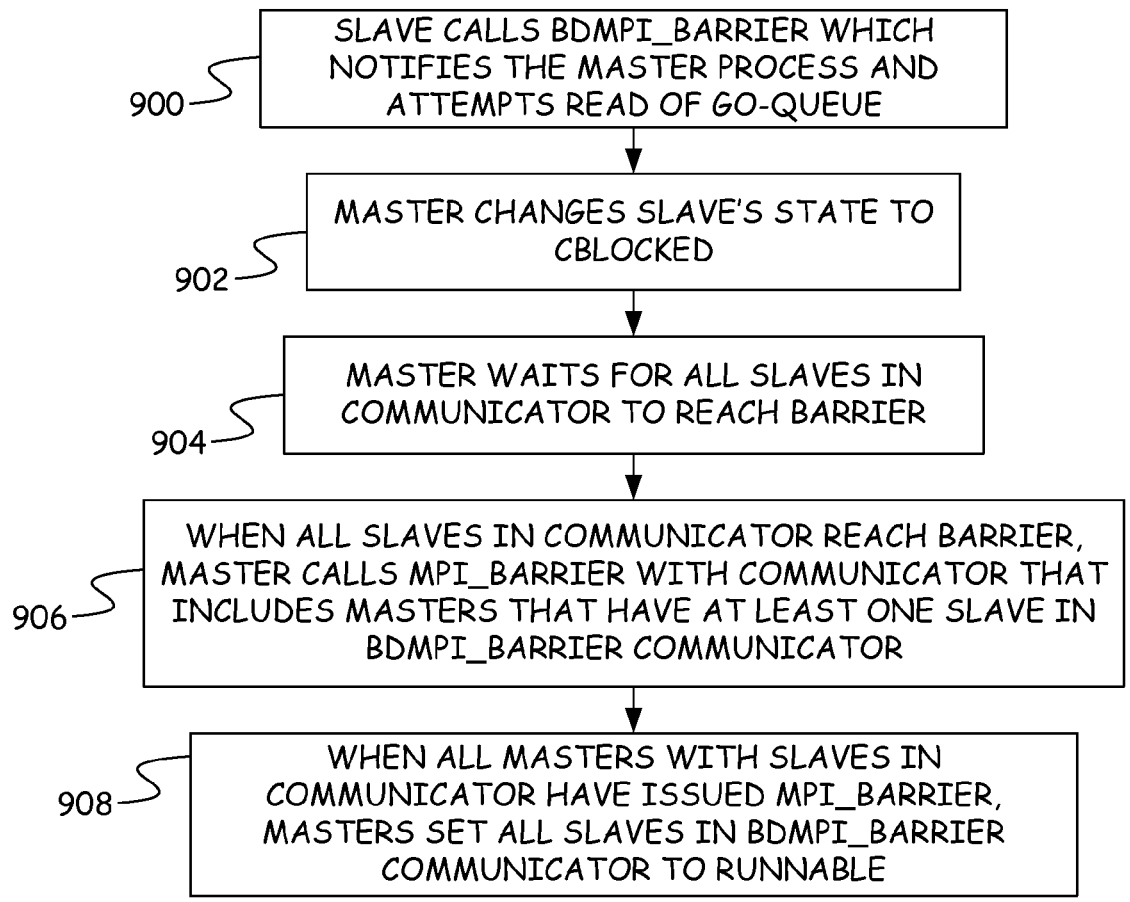
FIG. 9 is a flow diagram of a method of performing a BDMPI_Barrier function.

FIG. 9 provides a flow diagram of a method of performing a BDMPI_Barrier operation. At step 900 of FIG. 9, a slave process calls the BDMPI_Barrier function, which notifies the master process of the barrier call on slave/master communication queue 640. The BDMPI_Barrier function then attempts a read of go-queue 622 for the slave process. At step 902, the master process changes the slave state to cblocked indicating that the slave process is waiting for a collective event. At step 904, the master waits for all slaves in the communicator identified in the BDMPI_Barrier call that are on the same node as the master to reach the barrier and go to the cblocked state. At step 906, when all of the slaves in the communicator that are on the master's node have reached the barrier, master process 620 calls MPI_Barrier with an identification of a communicator that includes all the masters that have at least one slave in the communicator of the BDMPI_Barrier call.

At step 908, when all masters with slaves in the BDMPI_Barrier communicator have issued an MPI_Barrier call, the MPI_Barrier function indicates to each master that it can continue processing and in response each master sets all slaves in the communicator to runnable. Note that although the slave processes are set to runnable, they are not designated as being eligible for ready queue 618. Instead, the master process 620 will wait until a running slave process blocks and then determine which of the runnable slave processes are to be made eligible for ready queue 618 and write to the go-queue of that process at that time.

Figure 10:
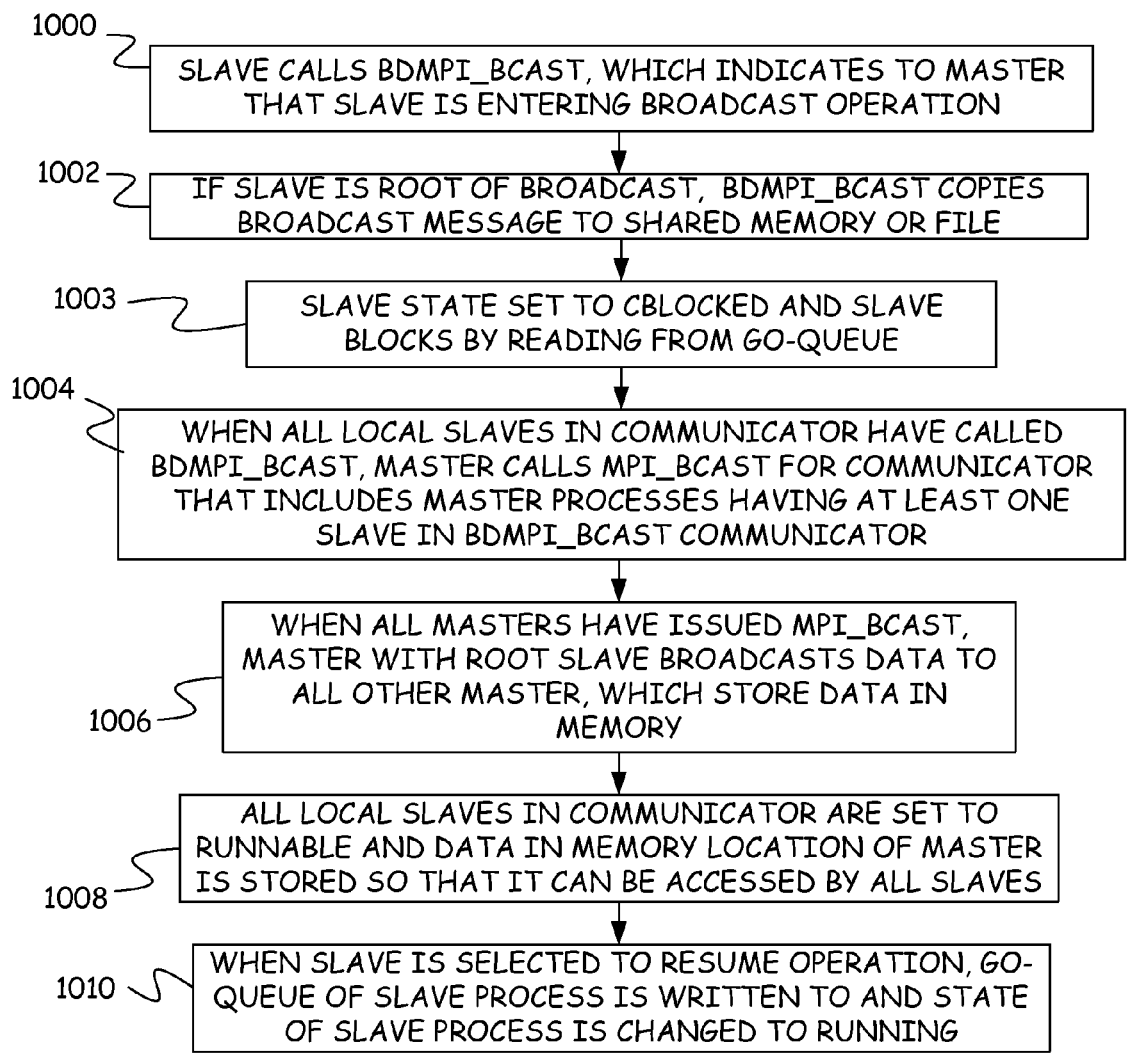
FIG. 10 is a flow diagram of a method of performing a BDMPI_Bcast function.

FIG. 10 provides a flow diagram of a method of implementing a BDMPI_Bcast function that broadcast messages to all processes in a communicator. At step 1000, a slave process calls BDMPI_Bcast, which indicates to the master process that the slave process is entering a broadcast operation. At step 1002, if the slave process is the root of the broadcast, the slave process stores the message to be broadcast in shared memory 646 or writes the message to a slave communication file 642 and provides the filename to master process 620 through slave/master communication queue 640. At step 1003, master 620 sets the slave process's state to cblocked and the slave process blocks by attempting a read of go-queue 622.

At step 1104, when all of a master's slaves that are part of the broadcast communicator have called BDMPI_Bcast, master 620 calls MPI_Bcast for a communicator that includes all of the masters that have at least one slave in the BDMPI_Bcast communicator.

At step 1006, when all the masters have issued an MPI_Bcast, the master with the root slave broadcasts the message to all the other masters, which store the message in their respective message buffer 644 or in a slave communication file 642.

At step 1008, all the slaves in the communicator are set to runnable by their respective master process 620 and the message in the memory location of the master process is stored so that it can be accessed by the master's slaves or the filename of the file containing the message is provided to each slave.

In step 1010, when a slave process is selected to resume operation, the go-queue of the slave process written to by master process 620 and the state of the slave process is changed to running.

Figure 11:
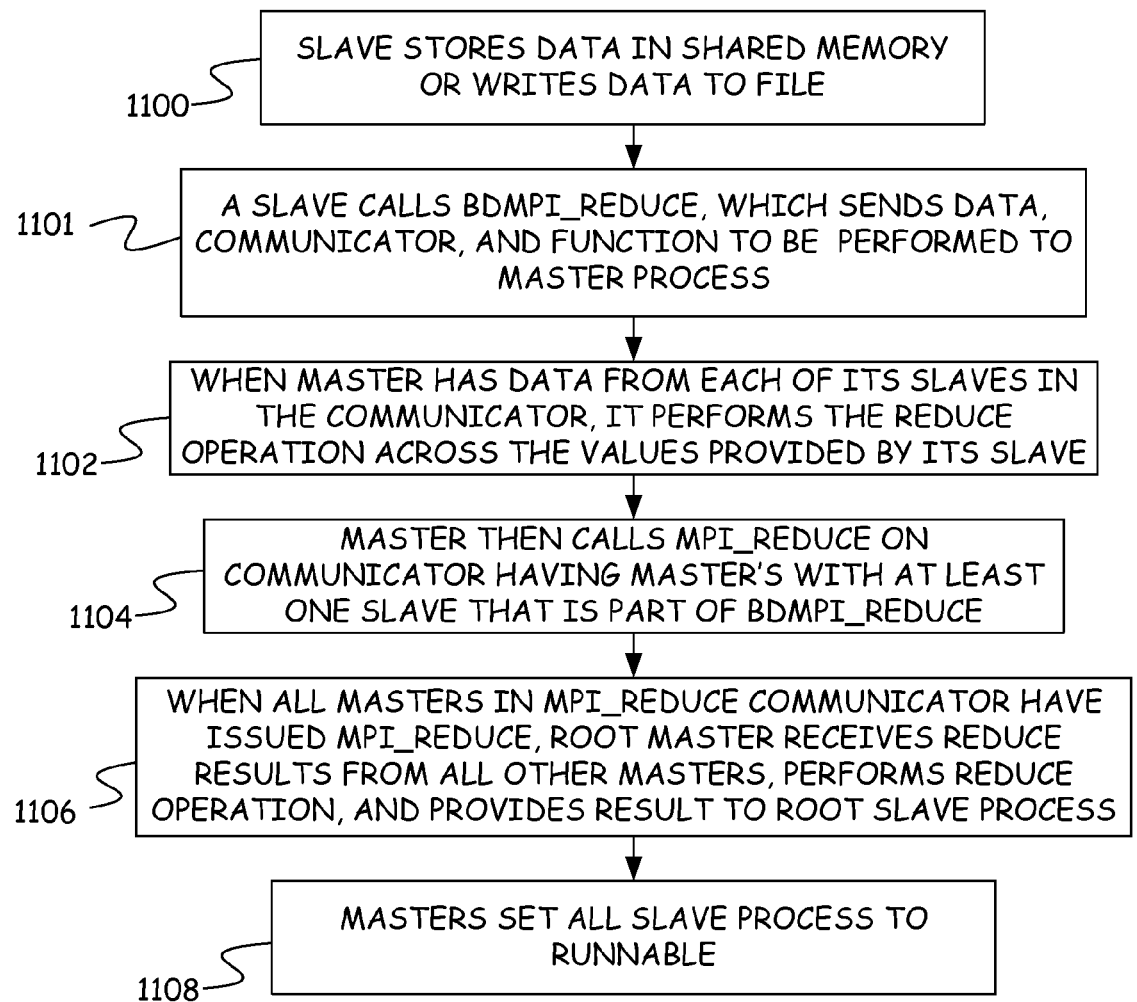
FIG. 11 is a flow diagram of a method of performing a BDMPI_Reduce function.

FIG. 11 provides a flow diagram for performing a BDMPI_Reduce operation or a BDMPI_Allreduce operation. At step 1100, a slave process stores data to be used in a reduce operation in shared memory 646 or in a slave communication file 642. At step 1101, the slave process calls BDMPI_Reduce providing the location of the data to be used in the reduce operation, the communicator to use in the reduce operation, and an identification of the reduce function. The BDMPI_Reduce function sends the location of the data, the communicator and the reduce function to master process 620 through communication queue 640.

At step 1102, when master process 620 has data from each of its slaves in the Reduce communicator, it performs the reduce operation across the data provided by its slaves. At step 1104, the master calls MPI_REDUCE on a communicator having masters with at least one slave in the BDMPI_Reduce communicator. If master 620 contains the root slave, the master designates itself as the root in the call to MPI_REDUCE. At step 1106, when all masters in the MPI_Reduce communicator have issued a MPI_Reduce call, the root master receives the reduce results from the other masters and performs the reduce operation on those results. The results of the reduce operation are then given to the root slave of the BDMPI_Reduce call. At step 1108, the masters in the MPI_Reduce communicator set all of their slave processes involved in the BDMPI_Reduce operation to runnable.

In the BDMPI_Bcast and BDMPI_Reduce operations, the masters store the data involved in memory as opposed to buffering them on disk. The rational for this is that since the amount of data involved does not increase with the size of the communicator, it does not create excessive memory requirements. Moreover, in order to ensure that the data is not swapped out, BDMPI has an option of locking it in physical memory.

The implementation of the other collective communication operations is different depending on the number of nodes involved. If more than one node is involved, these operations are implemented using BDMPI_Send and BDMPI_Recv operations or repeated calls to BDMPI_Bcast for the case of BDMPI_Allgather. If the number of nodes is one (i.e., all slaves in the communicator belong to the same node), the operations are performed using an analogous two-phase protocol, with the appropriate slave-to-master and master-to-slave data movement. The only difference is that based on the size of the data, they are either buffered in the memory of the master, or they are buffered on the disk of the node. This is done for two reasons. First, the amount of data involved is written and read only once, so there is little benefit for storing them in memory. Second, the aggregate amount of data can become very large (especially in the case of the all-to-all operation), which can lead to excessive memory swapping.

The majority of the information associated with a communicator is maintained by the masters, and the communicator-related information maintained by the slaves is minimal (id, rank, and size). The masters maintain information related to the identity of the slave processes and their location across the nodes. In addition, each BDMPI communicator has an associated MPI communicator containing the set of masters involved, which is used for the MPI operations that the masters need to perform among them. Finally, BDMPI implements the BDMPI_Comm_Split function, which provides a flexible mechanism to subdivide an existing communicator.

TABLE 2

BDMPI Extensions

BDMPI_ENTER_CRITICAL, BDMP_EXIT_CRITICAL
BDMPI_COMM_NSIZE, BDMPI_COMM_NRANK,
BDMPI_COMM_LSIZE, BDMPI_COMM_LRANK,
BDMPI_COMM_RRANK

BDMPI provides a small number of functions that are not part of the MPI standard in order to enable multiple slaves to be running concurrently in a contention-free fashion, facilitate intra-node synchronization, and to allow the program to get information about its execution Environment as it relates on how the processes are organized within each node. These functions are shown in Table 2.

The first two functions are used to indicate a section of the program during which only a single slave can be executing within each node. These critical sections are important for operations involving disk access (e.g., performing an MLOCK or file I/O), as it eliminated disk-access contention. Note that these critical sections are only relevant when nrunning is greater than one. These functions are implemented using POSIX semaphores.

The remaining functions have to do with extracting information from a communicator. The _NSIZE/_NRANK functions return the number of nodes (i.e., masters) in the communicator and the rank of the slave's master in that communicator, respectively. The _LSIZE/_LRANK functions return the number of other slaves residing on the same node as that of the calling slave and its rank, respectively. Finally, the _RRANK returns the rank of the lowest ranked slave in the same node as that of the calling slave.

BDMPI provides two additional built-in communicators: BDMPI_COMM_CWORLD and BDMPI_COMM_NODE. The first contains all the slaves across all the nodes numbered in a cyclic fashion, whereas the second contains all the slaves on the same node as that process. The first communicator is provided for programs that can achieve better load balance by splitting the ranks in a cyclic fashion across the nodes. The second communicator is provided so that the program can use it in order to perform parallel I/O at the node level or to create additional communicators that are aware of the two-level topology of the processes involved.

The performance of BDMPI was evaluated using three applications: (i) PageRank on an unweighted graph, (ii) spherical K-means clustering of sparse high-dimensional vectors, and (iii) matrix factorization using stochastic gradient descent (SGD) for recommender systems.

Our BDMPI implementation of PageRank uses a one-dimensional row-wise decomposition of the sparse adjacency matrix. Each BDMPI process gets a consecutive set of rows such that the number of non-zeros of the sets of rows assigned to each process is balanced. Each iteration of PageRank is performed in three steps using a push algorithm. Our BDMPI implementation of K-means uses an identical one-dimensional row-wise decomposition of the sparse matrix to be clustered as the PageRank implementation. The rows of that matrix correspond to the sparse vectors of the objects to be clustered. The K-way clustering starts by randomly selecting one of the processes $p_i$, which proceeds to select K of its rows as the centroids of the K clusters. Each iteration then proceeds as follows. Process $p^i$ broadcasts the K centroids to all other processes. Processes assign their rows to the closest centroids, compute the new centroids for their local rows, and then determine the new global centroids via a reduction operation. This process terminates when no rows have been reassigned. Our BDMPI implementation of SGD follows a parallelization approach and uses a $\sqrt{p} \times \sqrt{p}$ two-dimensional decomposition of the sparse rating matrix R to be factored into the product of U and V. Each iteration is broken down into $\sqrt{p}$ steps and in the ith step, computation is performed on the blocks along the ith diagonal. This ensures that at any given step, no two processes update the same entries of U and V. Note that in this formulation, at any given time, only $\sqrt{p}$ processes will be active performing SGD computations. Even though this is not acceptable on a p-processor dedicated parallel system, it is fine within the context of BDMPI execution, since multiple MPI processes are mapped on the same node.

For all of the above parallel formulations, we implemented three different variants. The first corresponds to their standard MPI implementations as described above. The second extends these implementations by inserting explicit function calls to lock in physical memory the data that is needed by each process in order to perform its computations and to unlock them when it is done. As a result of the memory locking calls (MLOCK), the OS maps from the swap file into the physical memory all the data associated with the address space and any subsequent accesses to that data will not incur any page faults. The third corresponds to an implementation in which the input data and selective intermediate data are explicitly read from and written to the disk prior to and after their use (in the spirit of out-of-core formulations). This implementation was done in order to evaluate the OS overheads associated with swap file handling and demand loading. We will use the MLOCK and ooc suffixes to refer to these two alternative versions.

In all of these benchmarks, the input data were replicated to all the nodes of the cluster and the processes took turns in reading their assigned data via BDMPI's execution model. That is, when only one process per node is allowed to execute at a time, only one process per node can read a file at a time. The exception to this is that when four processes were allowed to run at a time, we modified the BDMPI code such that the four processes took turns while reading the input data on each node. As a result, the I/O was parallelized at the node-level and was serialized at the within node slave-level. The output data were sent to the zero rank process, which wrote them to the disk.

We also developed serial out-of-core versions of these algorithms in order to evaluate the performance that can be achieved by programs that have been explicitly optimized for out-of-core processing. We will denote these algorithms by Serial-ooc. The out-of-core implementation of PageRank keeps the page rank vectors (current and next) in memory. During each iteration, the graph is processed in chunks, and a push algorithm (as in our BDMPI implementation) is used to update the next pagerank vector. The out-of-core implementation of K-means keeps the centroids (current and next) in memory. The matrix and the row cluster assignment vector are read in chunks from the disk during each iteration. Once a chunk of the matrix has been processed (i.e., the new cluster memberships have been determined and the new centroids have been partially updated), the chunk of the cluster assignment vector is written back to disk. The out-of-core implementation of SGD uses a two-dimensional decomposition of the input matrix into chunks. During an iteration, each matrix chunk and corresponding segments of U and V are read from disk and updates are made, before saving the segments of U and V back to disk. Note that the chunks are processed in a row-major order, as a result, the part of U corresponding to the current set of rows is read only once (at the start of processing the chunks of that row) and is written back to disk once (after all chunks have been processed).

The PageRank and SGD implementations provided by GraphChi 0.2 are used for comparison on the single-node experiments. For distributed PageRank we used the implementation from Pegasus 2.0. For distributed K-means we used the version provided with 0.7 of Mahout.

For the PageRank strong scaling experiments, uk-2007-05 web graph was used, with 105 million vertices and 3:3 billion edges. The undirected version of this graph is available as part of the 10*th DIMACS Implementation Challenge on Graph Partitioning and Graph Clustering*. To ensure that the performance of the algorithms is not affected by a favorable ordering of the vertices, the vertices of the graph were reordered randomly.

For the PageRank weak scaling experiments, the comorkut social network was used with three million vertices and 117 million edges as the base graph distributed to each slave process. In order to properly evaluate the scaling of BDMPI's intra- and inter-node communication operations, the graphs were re-wired such that one third of the edges are connected to vertices on other slaves within the same node, one third of the edges are connected to vertices on slaves located on adjacent nodes (i.e., node n has edges to nodes n−1 and n+1), and the final one third of edges are left as is. This ensures that for the weak scaling experiments, a scalable communication pattern is provided, yet still stresses the BDMPI communication operations by sending a large volume of messages.

For the K-means experiments a sparse document-term matrix of newspaper articles with 30 million rows and 83 thousand columns containing 7.3 billion non-zeros was used. For the weak scaling experiments, each slave was assigned a submatrix with 764 thousand rows and 183 million non-zeros.

For the SGD experiments, a dataset from the NetFlix Prize was used, replicated 128 times to create an 8×16 block matrix, with 3.8 million rows, 284 thousand columns, and 12.8 billion non-zeros. For the SGD weak scaling experiments, the first half of the rows of the NetFlix dataset was used as the base matrix distributed to each slave.

These experiments were run on two dedicated clusters. The first consisted of four Dell Optilex 9010s, each equipped with an Intel Core i7 @ 3:4 GHz processor, 4 GB of memory, and a Seagate Barracuda 7200 RPM 1:0 TB hard drive. Because of BDMPI's dependence on the swap-file for data storage, the machines were set up with 300 GB swap partitions. The four machines run the Ubuntu 12.04.2 LTS distribution of the GNU/Linux operating system. For the Hadoop based algorithms, we used version 1.1.2 of Hadoop and OpenJDK IcedTea6 1.12.5.

The second cluster was used for the weak scaling experiments of the PageRank and SGD benchmarks. The cluster consists of 20 compute nodes, each equipped with a Xeon E5-2620 @ 2.0 GHz processor, 4 GB of memory, and a 500 GB spinning hard drive. These machines each have a 64 GB swap file, and run the CentOS distribution of the GNU/Linux operating system.

For the three benchmarks we gathered results by performing ten iterations. The times that we report correspond to the average time required to perform each iteration, which was obtained by dividing the total time by the number of iterations. As a result, the reported times include the costs associated with loading and storing the input and output data.

Table 3 shows the performance achieved by the different programs on the PageRank benchmark.

Comparing the performance achieved by the various BDMPI versions, it can be seen that BDMPI-ooc performs the best whereas the BDMPI version (i.e., the version that corresponds to the unmodified MPI implementation executed via BDMPI's system) performs the worst. However, the performance difference between these two implementations is within a factor of two. The performance achieved by BDMPI-mlock is in between the other two versions. These results indicate that there are benefits to be gained by optimizing an MPI code for BDMPI's runtime system and that bypassing the OS's VMM system does lead to performance improvements.

TABLE 3

PageRank Performance

| Algorithm | Num. of Nodes = 1 | Num. of Nodes = 4 |
|---|---|---|
| BDMPI | 19.86 | 4.34 |
| BDMPI-mlock | 15.11 | 3.89 |
| BDMPI-ooc | 9.98 | 2.35 |
| MPI | 14.84 | 10.25 |
| Serial-ooc | 5.43 | N/Z |
| GraphChi[8 GB] | 45.90 | N/A |
| Pegasus (Hadoop) | N/A | 234.93 |

These results correspond to the number of minutes required to perform a single iteration of PageRank on the uk-2007-05 graph. Using a CSR structure, this graph takes 25:3 GB of storage. The single-node BDMPI runs were performed using 12 slave processes and the four-node runs were performed using 3 slave processes per node. In both cases, each slave has 2:1 GB of the graph. All BDMPI experiments were obtained by setting nrunning to one. The MPI results were obtained by MPICH using -np 1 and -np 4. Pegasus's PageRank job ran with a total of 1762 maps and eight reduces. The GraphChi results were obtained on a node with 8 GB of DRAM, as it was unable to run on a 4 GB node without swapping.

Comparing the results obtained on the four nodes over those obtained on a single node, it can be seen that most versions of BDMPI achieve super-linear speedups. This is due to the fact that the aggregate amount of memory in the four nodes are higher, which allows the slaves to retain more of their data in memory between successive suspension/resumption steps.

The performance achieved by the MPI version of the benchmark on a single node is better than that of the first two BDMPI versions, though its performance is worse than that of the BDMPI-ooc version. This result is somewhat surprising, since the single-node execution of the MPI version is nothing more than running the serial algorithm on the graph, and as such it relies entirely on the VMM system. However, this good performance can be attributed to the following two reasons. First, the BDMPI versions have to incur the overhead associated with the all-to-all communication for pushing the locally computed contributions of the pagerank vector to the slaves that are responsible for the corresponding vertices. Since the vertices of the input graph are ordered randomly and the single-node BDMPI experiments distribute the computations among twelve slaves, this step involves a non-trivial amount of communication. On the other hand, the single-node MPI experiment does not partition the graph and as such it does not incur that overhead. Second, the number of vertices in the graph is rather small and as a result, the pagerank vector fits in the physical memory. If that vector cannot fit in the physical memory, the performance will degrade substantially. To verify this, we performed an experiment in which we simulated a graph that has four times the number of vertices. For that graph, the first iteration of the single-node MPI version did not finish after six hours, whereas the time required by a single iteration of BDMPI-ooc took about 47 minutes using 50 slaves. Also it is interesting to note that the MPI version does not scale well on four nodes, as it achieved a speedup of only 1.45. We believe the primary reason for this is that the MPI version now has to incur the overhead associated with the all-to-all communication discussed earlier (as it decomposes the graph among four nodes), which significantly increases its overall runtime and thus reduces the speedup.

The overall best single-node results were obtained by the Serial-ooc version. This is not surprising as this implementation has been explicitly optimized for out-of-core execution. Comparing the single-node performance of BDMPI against that of Serial-ooc, we see that the performance penalty associated with BDMPI's more general approach for out-of-core computations does incur some extra overheads. However, these overheads are not very significant, as the best BDMPI version is less than two times slower than the optimized serial out-of-core implementation.

Finally, both the GraphChi and the Pegasus versions performed significantly worse than any of the other versions. Compared to BDMPI-ooc, on a single node, GraphChi is 4.6 times slower, whereas on four nodes, Pegasus is 100 times slower. This is because these computational models do not allow the same flexibility as the MPI API, and as a result the implementations require substantially more operations and memory movement.

Table 4 shows the results achieved by the different programs on the K-means benchmark. This table, in addition to the set of experiments in which the number of running slaves was set to one (i.e., "#R=1") also reports two additional sets of results. The first is for the case in which the maximum number of running slaves was set to four (i.e., "#R=4") and the second is for the case in which we used OpenMP to parallelize the cluster assignment phase of the computations. These results are reported under the "#T=4" columns and were obtained using four threads.

In terms of single-node performance, Serial-ooc performed the best, with BDMPI-ooc less than a minute behind in per-iteration time. BDMPI and BDMPI-mlock were 14% and 43% slower than BDMPI-ooc, respectively. This reversal of BDMPI and BDMPI-mlock's performance from the PageRank benchmark can be explained by the larger amount of computation required by K-means, where the overhead of page-faults could be offset. While this trend held for increasing the number of threads used, increasing the number of processes running resulted in BDMPI-mlock running 32% faster than BDMPI. This can be explained by the extra pressure put on the swap by BDMPI when all four running processes are generating page-faults. BDMPI is able to do better using four threads than BDMPI-mlock as it allows for computation and I/O to be overlapped, this is also why for BDMPI-mlock and BDMPI-ooc, four running processes perform better than four threads for intra-node parallelization. The speedups are below the ideal 4x because a significant portion of the runtime is spent saving/loading data to/from the single spinning disk on each node. The use of SSDs or multiple spinning drives per process/thread may result in speedup closer to the ideal.

TABLE 4

Spherical K-Means Performance

Number of Nodes = 1

| Algorithm | #R = 1/#T = 1 | #R = 4/#T = 1 | #R = 1/#T = 4 |
|---|---|---|---|
| BDMPI | 29.76 | 24.98 | 16.76 |
| BDMPI-mlock | 37.15 | 18.86 | 23.60 |
| BDMPI-ooc | 25.97 | 14.83 | 15.20 |
| MPI | 43.36 | N/A | 53.13 |
| Serial-ooc | 25.82 | N/A | N/A |

Number of Nodes = 4

| | #R = 1/#T = 1 | #R = 4/#T = 1 | #R = 1/#T = 4 |
|---|---|---|---|
| BDMPI | 7.45 | 5.75 | 3.75 |
| BDMPI-mlock | 7.59 | 3.98 | 4.82 |
| BDMPI-ooc | 6.98 | 4.35 | 4.14 |
| MPI | 18.13 | N/A | 21.98 |
| Mahout (Hadoop) | N/A | 1196.75 | N/A |

These results correspond to the number of minutes required to perform a single iteration of spherical k-means on the news dataset for K=100. In a CSR structure the total matrix takes 56 GB of storage. "#R" is the maximum number of slave processes that can run concurrently on a single node. "#T" is the number of OpenMP threads used to perform the computations within each slave process. All BDMPI runs using "#R=1" were performed using 20 slave process, whereas the "#R=4" runs were performed using 80 slave processes. When using 20 slaves, each slave stored 2:8 GB of matrix, and when using 80 slaves, each slave stored 717 MB of the matrix. For the single node experiments, all these slave processes were mapped on the same node, whereas for the four-node experiments, they were equally distributed among the nodes. Mahout's K-Means job ran with a total of 1014 maps and one reduce. The MPI results were obtained by MPICH using -np 1 and -np 4.

The close performance between the Serial-ooc version and the various BDMPI versions is due to the fact that unlike the PageRank benchmark, the K-means benchmark involves significantly more computations, which reduces the relative cost associated with data loading. Also similar to the PageRank benchmark, the four-node experiments show that BDMPI can achieve very good speedups, which in most cases range from 3.7 to 4.9. Finally, Mahout's Hadoop implementation of K-means was several orders of magnitude slower than the other methods we tested.

A notable difference between the K-means results and those of PageRank is that the performance achieved by the MPI version was significantly worse than that achieved by all BDMPI versions on both a single node and on four nodes. We believe that the reason for that is two-fold. Whereas a running BDMPI process fits within the available memory and thus its data needs to only be loaded from swap the first time its accessed, the MPI version does not fit within memory, and must migrate data to and from swap multiple times per iteration. This also explains the increase in runtime when using four threads, as the threads compete to keep their data resident in memory. Second, K-means incurs a lower communication overhead than that of the PageRank algorithm (broadcast/reduction vs all-to-all), which reduces the overhead associated with using the 20 slaves in the single-node BDMPI versions. Also this lower parallel overhead is the reason that the speedup achieved by the MPI version of K-means on four nodes is higher than the corresponding speedup achieved on the PageRank benchmark.

In terms of strong scaling, both BDMPI and BDMPI-mlock exhibited super-linear speedups between 4.3 and 4.9 using no intra-node parallelization, four threads, and four running processes per node, as a larger portion of the 56 GB of data fit in the increased aggregate memory of the system (16 GB compared to 4 GB). BDMPI-ooc did not benefit from this as each slave process reads and writes all of its data from and to the disk at resumption and suspension.

Table 5 shows the performance of the SGD benchmark. Results from two versions of SGD are presented. The first one randomly traverses the elements of the matrix, and the second randomly traverses the rows. The row-wise traversal has better data locality and is faster.

Comparing the runtimes of the different BDMPI versions we see that the relative ranking of the three versions remains the same. The BDMPI-ooc performs the best, whereas the simple BDMPI version performs the worst. However unlike the other two benchmarks, the performance of the simple BDMPI version is substantially worse than the other two versions. This is due to the randomized traversal of the non-zero elements of the matrix and associated factors, which lead to an essentially random access over the swap file. This poor performance is even worse for both the single and four-node MPI versions, neither of which manage to finish a single iteration in 50 hours.

The relatively good performance achieved by BDMPI-mlock and BDMPI-ooc is due to their loading of data into memory before processing, which greatly reduces the latency of the first access to each page of memory. In fact, their single-node performance relative to the Serial-ooc is very competitive, with BDMPI-mlock and BDMPI-ooc requiring at most 66% and 7% more time, respectively. The speedups achieved by the different BDMPI versions on four nodes are super-linear, which is consistent with similar trends observed on the other benchmarks. As it was the case with the earlier results, this can be attributed to the increase in the aggregate amount of physical memory.

TABLE 5

Gradient Descent Performance Element-wise Random Traversal

| Algorithm | Num. of Nodes = 1 | | Num. of Node = 4 | |
|---|---|---|---|---|
| | #R = 1 | #R = 4 | #R = 1 | #R = 4 |
| BDMPI | 756.13 | 2251.67 | 196.31 | 562.13 |
| BDMPI-mlock | 103.31 | 68.68 | 24.4 | 11.03 |
| BDMPI-ooc | 66.77 | 30.70 | 16.55 | 8.93 |
| MPI | >3000 | | | |
| Serial-ooc | 62.16 | N/A | N/A | N/A |
| BDMPI | 663.24 | 2078.83 | 168.16 | 545.17 |
| BDMPI-mlock | 58.99 | 54.18 | 14.25 | 10.03 |
| BDMPI-oc | 29.83 | 15.44 | 7.36 | 4.03 |
| MPI | >3000 | | | |
| Serial-ooc | 28.29 | N/A | N/A | N/A |
| GraphiChi[8 GB] | 59.78 | N/A | N/A | N/A |

These results correspond to the number of minutes required to perform a single iteration of stochastic gradient descent on the 128 copies of the Net-Flix for 20 latent factors. In a CSR structure this matrix requires 96.2 GB of storage. In the MPI runs, none of the iterations finished within the allotted time. "#R" is the maximum number of slave processes that can run concurrently on a single node. All BDMPI runs were performed using 256 slave processes in a 16×16 configuration, where each slave stores 385 MB of the matrix. For the single node experiments, all these slave processes were mapped on the same node, whereas for the four-node experiments, they were equally distributed among the nodes. The GraphChi results were obtained on a node with 8 GB of DRAM, as it was unable to run on a 4 GB node without swapping.

The results for the experiments in which the number of running slaves was set to four ("#R=4") are also consistent with the earlier observations. Because multiple slave processes incur page faults concurrently, the performance of the simple BDMPI version degrades. However, the performance of the other two versions improves, with BDMPI-ooc improving more than BDMPI-mlock. This is because BDMPI-mlock's cost of prefetching the data is higher than that of BDMPI-ooc, and since this step is serialized across the running slaves, it limits the overall speedup that it can obtain.

TABLE 6

PageRank Weak Scaling

| | Num. of Nodes | | | | |
|---|---|---|---|---|---|
| | 1 | 5 | 10 | 15 | 20 |
| Mil. Of Edges | 937.4 | 4,687.4 | 9,374.8 | 14,062.2 | 18,749.6 |
| | | BDMPI | | | |
| Iter. Runtime (m) | 2.50 | 3.30 | 3.47 | 3.69 | 3.77 |
| | | BDMPI-mlock | | | |
| Iter. Runtime (m) | 3.06 | 3.93 | 4.16 | 4.40 | 4.56 |
| | | BDMPI-oc | | | |
| Iter. Runtime (m) | 2.26 | 2.68 | 2.85 | 2.97 | 3.17 |

These results correspond to the number of minutes required to perform a single iteration of PageRank. Each node contains eight slave processes, and each slave process has 3,072,441 vertices and 117,185,083 edges. Each slave has 1.8 GB of data, resulting in an aggregate 14.4 GB of data per node (each node has only 4 GB of DRAM).

Finally, the last row of Table 5 shows the performance achieved by GraphChi's SGD implementation. GraphChi's implementation keeps both the user and item factors in memory and also visits the rows of the entire matrix in a random order. This row-wise traversal has better locality than the row-wise traversal used by BDMPI and Serial-ooc versions, as the latter perform the row-wise traversal within each block of the 16×16 decomposition of the matrix (traversing ¹⁄₁₆ of each row at a time). Despite these, BDMPI-mlock was 1.3% faster and BDMPI-ooc was 100% faster on a single node.

Table 6 shows the scaling of the three BDMPI implementations for the PageRank benchmark, where we increase the number of nodes used, while keeping the work per node constant. When running beyond a single node, we see a jump in the per iteration runtime due to the communication of large amounts of data between nodes. As described in Section 5.3, the sending of large messages between nodes in BDMPI requires writing and reading the message to disk twice, once on the local node, and once on the remote node. As one third of the edges are between vertices on different nodes in this experiment, these disk operations account for a large part of the 56% increase on average in the per iteration runtime when running five nodes compared to one.

The 23.3% increase in runtime among the three BDMPI implementations from five nodes to 20 can be attributed to the varying time it took to read/write from/to the disk. As we increased the number of nodes, we increased the likely-hood at each iteration of having to wait for a node exhibiting slow I/O performance.

TABLE 7

K-Means Weak Scaling

| | Num. of Nodes | | | | |
|---|---|---|---|---|---|
| | 1 | 5 | 10 | 15 | 20 |
| Mil. Of Non-Zeros | 183.6 | 734.4 | 1,468.8 | 2,203.3 | 2,937.7 |
| | | BDMPI | | | |
| Iter. Runtime (m) | 6.66 | 6.86 | 6.91 | 6.95 | 7.04 |
| | | BDMPI-mlock | | | |
| Iter. Runtime (m) | 7.68 | 8.12 | 8.25 | 8.40 | 8.45 |
| | | BDMPI-oc | | | |
| Iter. Runtime (m) | 6.45 | 6.63 | 7.15 | 7.49 | 8.08 |

These results correspond to the number of minutes required to perform a single iteration of K-Means. Each node contains eight slave processes, and each slave process has 183,609,600 non-zeros of the sparse matrix. Each slave has 1.4 GB of data, resulting in an aggregate 11.2 GB of data per node (each node has only 4 GB of DRAM).

Table 7 shows the scaling of the three BDMPI implementations for the K-means benchmark, where we increase the number of nodes used while keeping the work per node constant. As with PageRank, we see the time per iteration climb as we increase the number of nodes and the problem size.

Due to the higher ratio of computation to communication in this benchmark, we see superior scaling compared to that of the PageRank benchmark. From one to five nodes, the average iteration time increased by 3.8% across all three versions. From five to 20 nodes, the average iteration time increased by 9.2% across all three versions.

With relatively sequential memory access and high computation to communication ratio, the K-means benchmark is an ideal application for BDMPI as shown by its ability scale.

Table 8 shows the scaling of the three BDMPI implementations for the SGD benchmark, where we increase the number of nodes used while keeping the work per node constant. For SGD, we only use one, four, and 16 nodes due to our $\sqrt{p} \times \sqrt{p}$ decomposition as explained above. As with the weak scaling of the PageRank benchmark, an immediate increase in runtime is seen as the cost cross-node communication is added. This increase is much larger for BDMPI and BDMPI-mlock as the communication structures of the BDMPI runtime and underlying MPI runtime may not be resident in memory at the start of a communication operation. This is most pronounced for the BDMPI-mlock version, in which running on four nodes we have a 27% increase in runtime. However, going from four nodes to 16, we only have a 4.2% increase in runtime.

TABLE 8

Stochastic Gradient Descent Weak Scaling

| | Num. of Nodes | | |
|---|---|---|---|
| | 1 | 4 | 16 |
| Mil. of Non-Zeros | 803.2 | 3,212.9 | 12,851.7 |
| | BDMPI | | |
| Iter. Runtime (m) | 35.32 | 38.53 | 49.13 |
| | BDMPI-mlock | | |
| Iter. Runtime (m) | 6.17 | 6.59 | 6.92 |
| | BDMPI-oc | | |
| Iter. Runtime (m) | 4.64 | 4.80 | 4.94 |

These results correspond to the number of minutes required to perform a single iteration of stochastic gradient descent using element-wise random traversal for 20 latent factors. Each node has 16 slave processes and each slave has 50,201,924 non-zeros of the sparse matrix. Each slave has 440 MB of data, resulting in an aggregate 6:88 GB of data per node (each node has only 4 GB of DRAM).

For the BDMPI version of the SGD benchmark, a large increase in runtime exists when running on 16 nodes instead of 4. The random-element access pattern of this benchmark causes significant page thrashing and increased iteration runtime variability. As the problem size increases and the number of nodes are used, more nodes must wait idly at the end of each iteration. When using 16 nodes, variations in per-iteration runtime as high as 5.8 minutes are observed.

BDMPI-oc, as it does not rely on swap, does not suffer from its communication structures possibly not being resident in memory, and its runtime only increases by 1.7% when run on four nodes, and 3.0% when running on 16 nodes.

Figure 12:
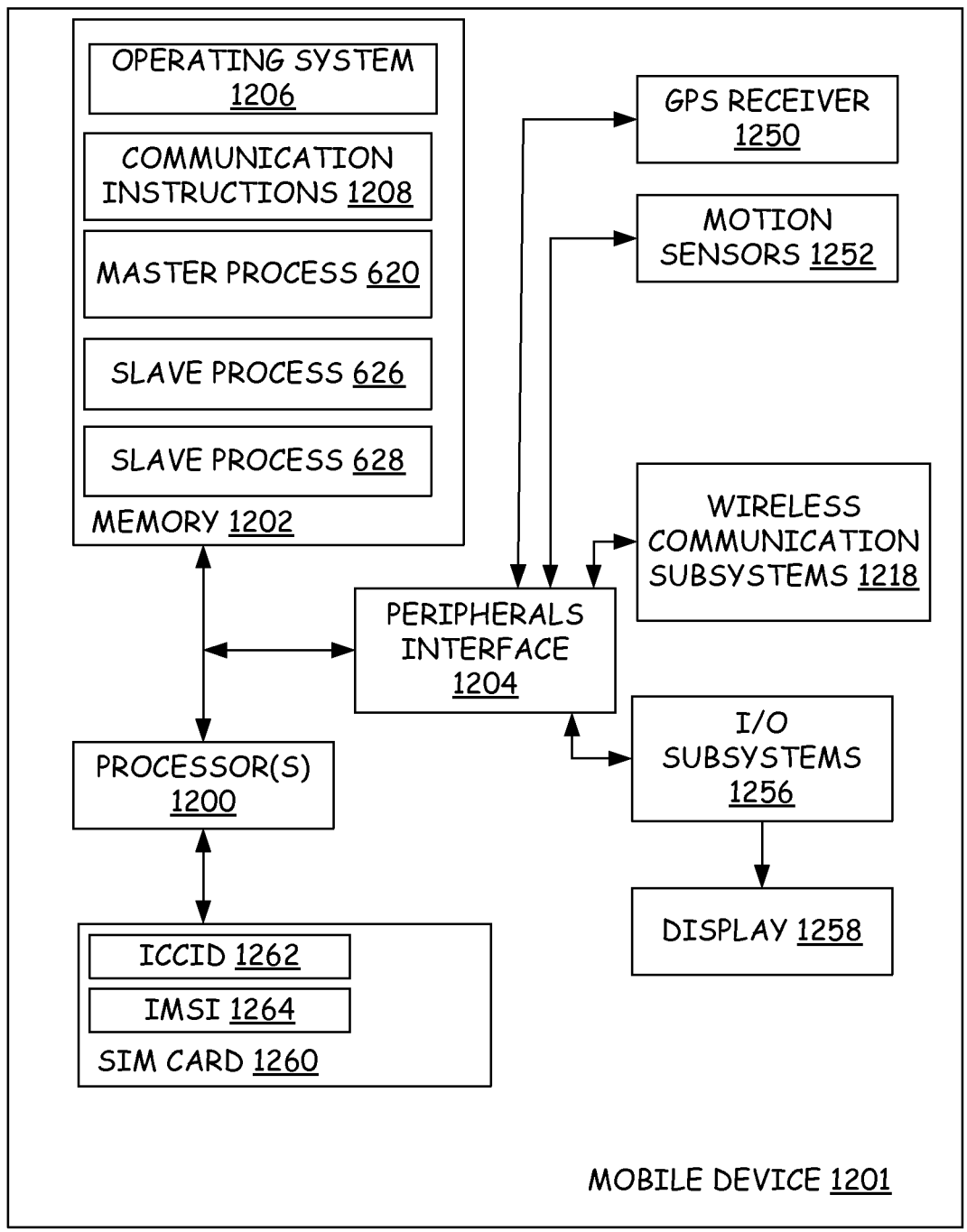
FIG. 12 is block diagram of a mobile computing device that may be used as a node or computing machine in the various embodiments.

FIG. 12 provides a block diagram of a mobile device 1201, which can be used as a node in the embodiments described above. Mobile device 1201 includes one or more processors 1200, such as one or more central processing units and/or image processors, and a memory 1202. Processor(s) 1200 and memory 1202 are connected by one or more signal lines or buses. Memory 1202 includes a volatile portion that can take the form of a Random Access memory and a nonvolatile portion that can take the form of any processor-readable medium including a disk or solid-state memory, for example. Memory 1202 includes an operating system 1206 that includes instructions for handling basic system services and performing hardware-dependent tasks. In some implementations, operating system 1206 can be a kernel. Memory 1202 also includes various instructions representing applications that can be executed by processor(s) 1200 including communication instructions 1208 that allow processor 1200 to communicate through peripherals interface 1204 and wireless communication subsystems 1218 to a wireless cellular telephony network and/or a wireless packet switched network. Memory 1202 can also hold master process 620, slave processes 626, 628, 630, 632, 634, and 636, ready queue 618, slave go-queues 622, slave process states 624, message buffer 644, slave/master communication queues 640 and slave/master shared memory 646.

Peripherals interface 1204 also provides access between processor(s) 1200 and one or more of a GPS receiver 1250, motion sensors 1252, and input/output subsystems 1256. GPS receiver 1250 receives signals from Global Positioning Satellites and converts the signals into longitudinal and latitude information describing the location of mobile device 1201. The position of mobile device 12601 may also be determined using other positioning systems such as Wi-Fi access points, television signals and cellular grids. Motion sensors 1252 can take the form of one or more accelerometers, a magnetic compass, a gravity sensor and/or a gyroscope. Motion sensors 1252 provide signals indicative of movement or orientation of mobile device 1201. I/O subsystems 1256 control input and output for mobile device 1201. I/O subsystems 1256 can include a touchscreen display 1258, which can detect contact and movement or break thereof using any of a plurality of touch sensitivity technologies including, but not limited to capacitive, resistive, infrared and surface acoustic wave technologies as well as other proximity sensor arrays or other elements for determining one or more points of contact with display 1258. Other inputs can also be provided such as one or more buttons, rocker switches, thumb wheel, infrared port, USB port and/or pointer device such as a stylus.

Mobile device 1201 also includes a subscriber identity module, which in many embodiments takes the form of a SIM card 1260. SIM card 1260 stores an ICCID 1262 and an IMSI 1264. ICCID 1262 is an Integrated Circuit Card Identifier, which uniquely identifies this card on all networks. IMSI 1264 is an international mobile subscriber identity, which identifies the SIM card on an individual cellular network. When communicating through wireless communication subsystems 1218, processor(s) 1200 can use identifiers 1262 and/or 1264 to uniquely identify mobile device 1201 during communications. In accordance with many embodiments, SIM card 1260 is removable from mobile device 1201 and may be inserted in other devices.

By applying the BDMPI parallel processing embodiments to the mobile device of FIG. 12 it is possible to reduce the size of the volatile memory needed on the mobile device and thereby reduce the energy used by the mobile device. In particular, since BDMPI limits the number of parallel processes that can be in the ready queue at any one time so that the amount of volatile memory needed by the processes in the ready queue does not exceed the amount of volatile memory available to the processor(s), a smaller volatile memory can be used without incurring memory thrashing or disk access delays.

Figure 13:
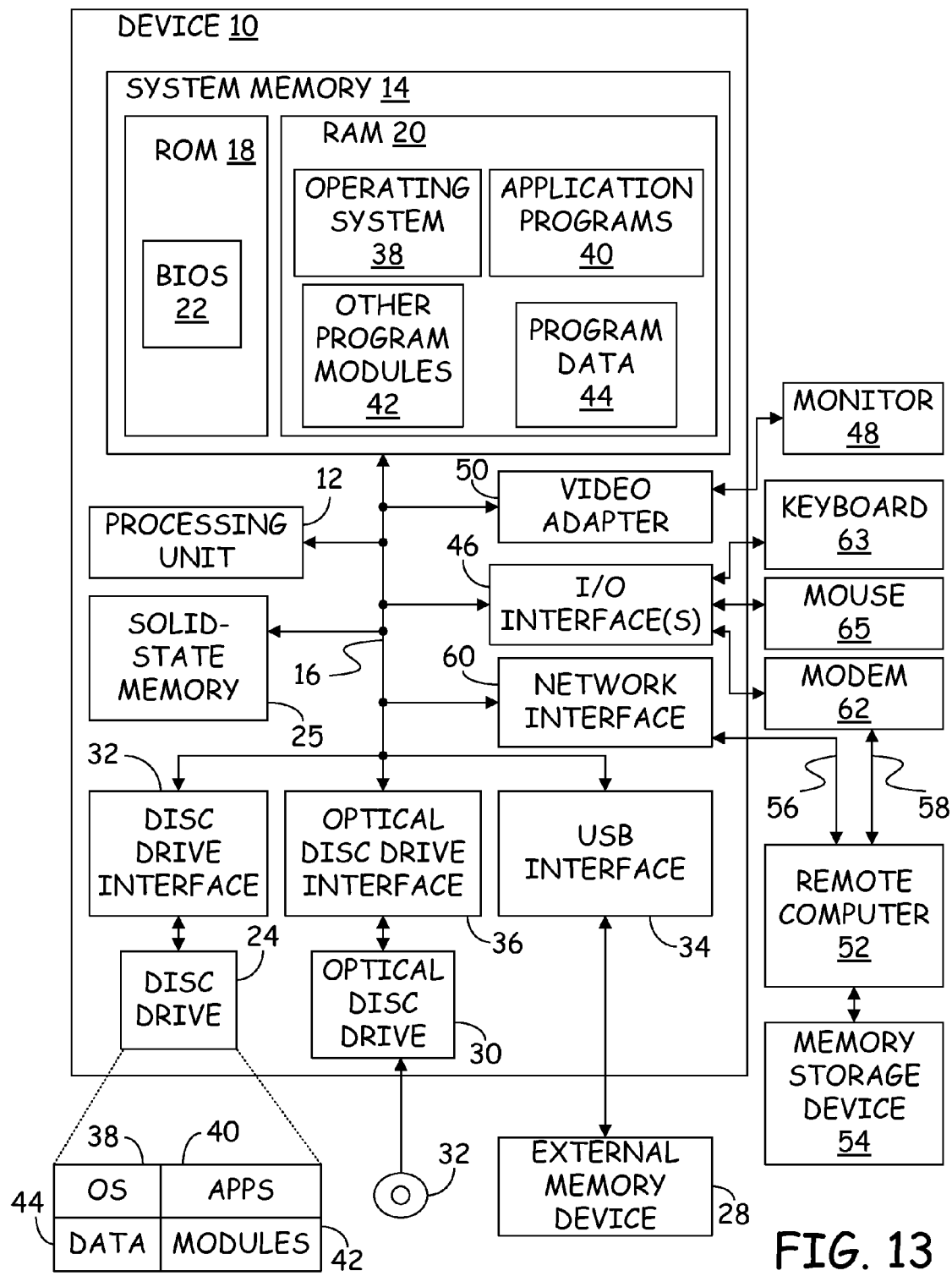
FIG. 13 is block diagram of a device that may be used as a node or computing machine in the various embodiments.

An example of a computing device that can be used as a node in the various embodiments is shown in the block diagram of FIG. 13. The computing device 10 of FIG. 13 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable storage media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for executing the methods described above including master process 620 and slave processes 626 628, 630, 632, 634, and 636. Program data 44 may include ready queue 618, slave go-queues 622, slave process states 624, message buffer 644, slave/master communication queues 640 and slave/master shared memory 646.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 13. The network connections depicted in FIG. 20 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 13 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method of executing a set of processes, the method comprising:
   assigning multiple slave processes and a master process to a node executing an operating system, wherein the operating system maintains a ready queue comprising a list of one or more slave processes that are ready to be executed by at least one processing core of the node;
   a slave process of the assigned multiple slave processes taking an action that causes the operating system to keep the slave process out of the ready queue;
   based on receiving an indication from the slave process that the slave process is to be kept out of the ready queue, the master process:
     assigning the slave process to a blocking state,
     selecting a second slave process of the assigned multiple slave processes that is in a runnable state but is currently kept from being in the ready queue, and
     taking an action that causes the operating system to add the second slave process that is in the runnable state to the ready queue.

2. The method of claim 1 wherein receiving an indication that a slave process is to be kept out of the ready queue comprises receiving an identification of a condition that must be satisfied in order for the slave process to be added to the ready queue.

3. The method of claim 2 further comprising the master process receiving an indication that the condition has been satisfied and in response, the master process changing the slave process from a blocking state to a runnable state.

4. The method of claim 1 wherein the assigned multiple slave processes and the master process together prevent the operating system from placing all of the multiple slave processes assigned to the node in the ready queue at the same time.

5. The method of claim 1 wherein the master process ensures that the slave processes in the ready queue together use fewer resources than are available to the at least one processing core.

6. The method of claim 5 wherein the at least one resource comprises volatile memory.

7. The method of claim 1 further comprising before a slave process of the assigned multiple slave processes takes an action that causes the operating system to keep the slave process out of the ready queue, the slave process taking action to reduce an amount of a resource the slave process uses.

8. The method of claim 7 wherein the slave process taking action to reduce an amount of a resource the slave process uses comprises the slave process writing to a nonvolatile memory to reduce the amount volatile memory used by the slave process.

9. The method of claim 1 wherein selecting a second slave process of the assigned multiple slave processes that is in a runnable state comprises identifying multiple slave processes of the assigned multiple slave processes that are in a runnable state and selecting one such slave process.

10. The method of claim 9 wherein selecting a second slave process of the assigned multiple slave processes that is in a runnable state comprises selecting based on an amount of a resource that the slave process is currently controlling.

11. The method of claim 10 wherein selecting based on an amount of a resource that the slave process is currently controlling comprises selecting based on an amount of the slave process that is currently loaded in volatile memory.

12. The method of claim 1 further comprising assigning multiple second slave processes and a second master process to a second node wherein the multiple slave processes and the master process assigned to the node and the multiple second slave processes and the second master process assigned to the second node are part of a single application.

13. The method of claim 1 further comprising assigning additional multiple slave processes and an additional master process to the node.

14. A parallel processing system comprising:
   a computing machine having a master process and a plurality of parallel slave processes assigned thereto, the computing machine being controlled by a scheduler that schedules when slave processes are executed on at least one processing core of the computing machine, wherein each slave process is able to indicate that it is waiting for a blocking condition to be satisfied and in response the scheduler excludes a respective waiting slave process from the scheduled slave processes and wherein an excluded slave process continues to be excluded from the scheduled slave processes even after the blocking condition is satisfied until the master process causes the scheduler to schedule the excluded slave process for execution on the at least one processing core.

15. The parallel processing system of claim 14 wherein the master process ensures that the plurality of parallel slave processes scheduled to be executed on the at least one processing core together use fewer resources than are available to the at least one processing core.

16. The parallel processing system of claim 15 wherein the master process ensures that the plurality of parallel slave processes scheduled to be executed on the at least one processing core together use less volatile memory than the volatile memory available to the at least one processing core.

17. The parallel processing system of claim 16 wherein the plurality of parallel slave processes together use more resources than are available to the at least one processing core.

18. The parallel processing system of claim 17 wherein the plurality of parallel slave processes together use more volatile memory than an amount of volatile memory available to the at least one processing core.

19. The parallel processing system of claim 14 further comprising a second computing machine having a second master process and a second plurality of parallel slave processes assigned thereto, the second computing machine being controlled by a second scheduler that schedules when slave processes of the second plurality of parallel slave processes are executed on at least one second processing core, wherein each slave process in the second plurality of parallel slave processes is able to indicate that it is waiting for a blocking condition to be satisfied and in response, the second scheduler excludes a respective waiting slave process from the scheduled slave processes for the at least one second processing core and wherein an excluded slave process continues to be excluded from the scheduled slave processes even after the blocking condition has been satisfied until the second master process causes the second scheduler to schedule the excluded slave process for execution on the at least one second processing core.

20. The parallel processing system of claim 19 wherein a slave process assigned to the computing machine sends information to a slave process assigned to the second computing machine by passing the information to the master process, the master process passing the information to the second master process and the second master process providing the information to the slave process assigned to the second computing machine.

21. The parallel processing system of claim 19 wherein a slave process assigned to the computing machine sends information directly to a slave process assigned to the second computing machine.

22. A computing system comprising:
a processor; and
a memory storing a list of slave processes that are scheduled to be executed by the processor such that at least one slave process stored in the memory is in a runnable state but is prevented by a master process stored in the memory from being added to the list of slave processes scheduled to be executed by the processor when adding the slave process would cause the total amount of resources needed by the slave processes in the list to exceed the amount of resources available to the computing system, wherein a slave process is in the runnable state when a blocking condition it has been waiting for has been satisfied.

23. The computing system of claim 22 wherein the memory has stored thereon a plurality of slave processes that have begun execution but have not completed execution and wherein at any time, at least one of the plurality of slave processes that is not currently being executed by the processor is prevented from being added to the list of slave processes scheduled to be executed by the processor.

24. The computing system of claim 23 wherein a slave process that is in a runnable state is only added to the list of slave processes scheduled to be executed by the processor when another slave process being executed by the processor enters a blocking state.

25. The computing system of claim 24 wherein the master process is notified when a slave process enters a blocking state and in response writes to a go-queue of a slave process in a runnable state to cause an operating system of the processor to add the slave process in the runnable state to the list of slave processes that are scheduled to be executed.

26. The computing system of claim 25 wherein the memory comprises a non-volatile portion and a volatile portion and the plurality of slave processes together require more memory than is available in the volatile portion.

\* \* \* \* \*